US007385187B2

(12) United States Patent
Verentchikov et al.

(10) Patent No.: US 7,385,187 B2
(45) Date of Patent: Jun. 10, 2008

(54) MULTI-REFLECTING TIME-OF-FLIGHT MASS SPECTROMETER AND METHOD OF USE

(75) Inventors: Anatoli Verentchikov, St. Petersburg (RU); Mikhail Yavor, St. Petersburg (RU); Joel C. Mitchell, Bridgman, MI (US); Viatcheslav Arteav, St. Joseph, MI (US)

(73) Assignee: Leco Corporation, St. Joseph, MI (US)

( * ) Notice: Subject to any disclaimer, the term of this patent is extended or adjusted under 35 U.S.C. 154(b) by 182 days.

(21) Appl. No.: 10/561,775

(22) PCT Filed: Jun. 18, 2004

(86) PCT No.: PCT/US2004/019593

§ 371 (c)(1),
(2), (4) Date: Dec. 20, 2005

(87) PCT Pub. No.: WO2005/001878

PCT Pub. Date: Jan. 6, 2005

(65) Prior Publication Data

US 2007/0029473 A1 Feb. 8, 2007

(30) Foreign Application Priority Data

Jun. 21, 2003 (GB) ................................ 0314568.7

(51) Int. Cl.
*B01D 59/44* (2006.01)

(52) U.S. Cl. ...................... 250/287; 250/281; 250/282; 250/283; 250/294; 250/298

(58) Field of Classification Search ................ 250/287, 250/281, 282, 283, 294, 298
See application file for complete search history.

(56) References Cited

U.S. PATENT DOCUMENTS

| | | | | |
|---|---|---|---|---|
| 4,072,862 | A | 2/1978 | Mamyrin et al. | |
| 4,963,736 | A | 10/1990 | Douglas et al. | |
| 5,017,780 | A * | 5/1991 | Kutscher et al. | 250/287 |
| 5,070,240 | A | 12/1991 | Lee et al. | |
| 5,202,563 | A * | 4/1993 | Cotter et al. | 550/287 |

(Continued)

FOREIGN PATENT DOCUMENTS

EP 1237044 9/2002

(Continued)

OTHER PUBLICATIONS

Benjamin M. Chien, et al., "Plasma Source Atmospheric Pressure Ionization Detection of Liquid Injection Using an Ion Trap Storage/ Reflectron Time-of-flight Mass Spectromerty," Anal. Chem. 1993, 65, 1916-1924.

(Continued)

*Primary Examiner*—Robert Kim
*Assistant Examiner*—Michael Maskell
(74) *Attorney, Agent, or Firm*—Price, Heneveld, Cooper, DeWitt & Litton, LLP

(57) ABSTRACT

A multiple reflecting time-of-flight mass spectrometer (MR-TOF MS) and method of analysis are disclosed. The flight path of ions is folded along a trajectory by electrostatic mirrors. The longer flight path provides higher resolution while maintaining a moderate instrument size.

59 Claims, 14 Drawing Sheets

U.S. PATENT DOCUMENTS

| | | | |
|---|---|---|---|
| 5,763,878 | A | 6/1998 | Franzen |
| 5,847,386 | A | 12/1998 | Thomson et al. |
| 6,020,586 | A | 2/2000 | Dresch et al. |
| 6,107,625 | A | 8/2000 | Park |
| 6,111,250 | A | 8/2000 | Thomson et al. |
| 6,331,702 | B1 | 12/2001 | Krutchinsky et al. |
| 6,504,150 | B1 | 1/2003 | Verentchikov et al. |
| 6,545,268 | B1 | 4/2003 | Verentchikov et al. |
| 6,670,606 | B2 | 12/2003 | Verentchikov et al. |
| 6,674,069 | B1 | 1/2004 | Martin et al. |

FOREIGN PATENT DOCUMENTS

| | | |
|---|---|---|
| GB | 2080021 | 7/1981 |
| GB | 2361353 | 10/2001 |
| GB | 2378312 | 2/2003 |
| SU | 198034 | 12/1967 |
| SU | 1681340 | 9/1991 |
| SU | 1725289 | 4/1992 |
| SU | 1725289 A1 * | 4/1992 |
| WO | WO 9103071 | 3/1991 |
| WO | WO 9930350 | 6/1999 |
| WO | WO 0178106 | 10/2001 |
| WO | WO 2004008481 | 1/2004 |

OTHER PUBLICATIONS

John B. Hoyes, et al., "A High Resolution Orthogonal TOF with Selectable Drift Length," ASMS2000.

Qinchung Ji, et al., "A Segmented Ring, Cylindrical Ion Trap Source for Time-of-flight Mass Spectrometry," J Am Soc Mass Spectrom 1996, 7, 1009-1017.

Alfonz Luca, et al., "On the combination of a Linear Field Free Trap with a TOF MS," 2001 American Institute of Physics, Review of Scientific Instruments, vol. 72 No. 7, Jul. 2001, pp. 2900-2908.

V.I. Karataev, B.A. Mamyrin, and D.V. Shmikk, "New Method for Focusing Ion Bunches in TOF MS," Sov. J. Tech. Phys. 41 (1971) 1498, Soviet Physics—Technical Physics, vol. 16, No. 7, pp. 1177-1179, (Jan. 1972).

Melvin A. Park, et al., "High m/z Range, High Resolution Coaxial Multiple Reflection ESI-TOFMS," Proceedings of the 49th ASMS Conference on Mass Spectrometry, Chicago, IL, (May 27-31, 2001).

T. Sakurai, et al., "A New Multi-passage Time-of-flight Mass Spectrometer at JAIST," Nucl. Instr.and Meth. in Phys. Res., A 427 (1999) 182-186.

T. Sakurai, et al., "Ion Optics of a High Resolution Multipassage Mass Spectrometer with Electrostatic Ion Mirrors," Nucl. Instr. and Meth. in Phys. Res., A 363 (1995) 473-476.

H. Wollnik and M. Przewloka, "Time-of-Flight Mass Spectrometers with Multiply Refelcted Ion Trajectories," International Journal of Mass Spectrometery and Ion Processes, vol. 96, No. 3, pp. 267-274, (Apr. 16, 1990).

H. Wollnik, A. Casares, "An Anergy-isochronous Multi-pass TOF MS Consisting of Two Coaxial Electrostatic Mirrors," International Journal of Mass Spectrometry 227 (2003) pp. 217-222.

H. Wollnik, "Mass Separators," Nuclear Instruments and Methods in Physics Research, A 258, (1987) pp. 289-296.

H. Wollnik, "Time-of-Flight Mass Analyzers," Mass Spectromery Reviews, 1993, 12, 89-114, John Wiley & Sons.

* cited by examiner

25

| Electrode | 14 Drift | 15L Lens | 15E electr 1 | 15E electr 2 | 15C Cap |
|---|---|---|---|---|---|
| U/E | 0 | -2.0842 | .1766 | 0.9616 | 1.3148 |

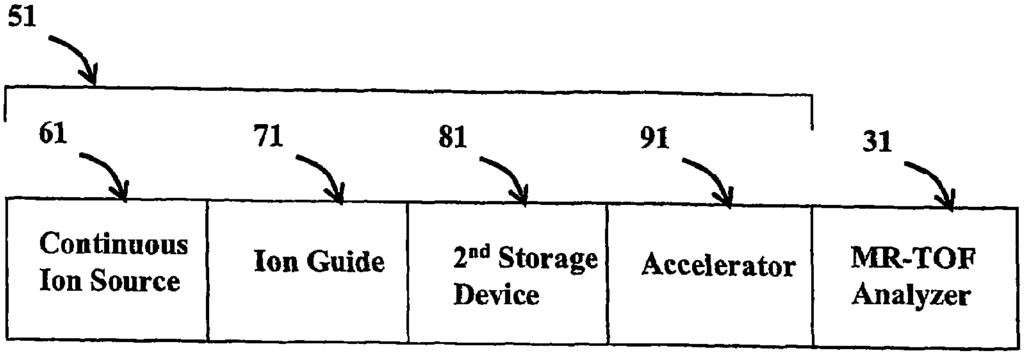
*Fig. 7A*
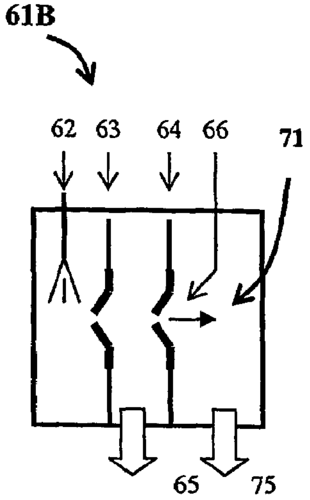
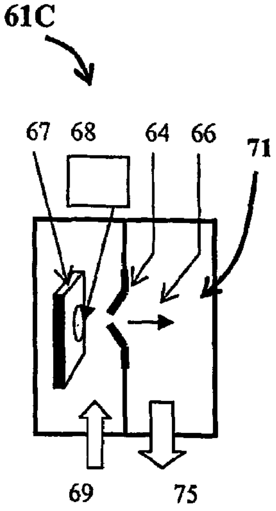
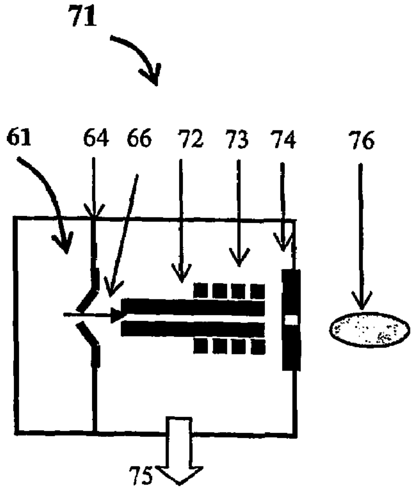
*Fig. 7B* *Fig. 7C* *Fig. 7D*

MULTI-REFLECTING TIME-OF-FLIGHT MASS SPECTROMETER AND METHOD OF USE

BACKGROUND OF THE INVENTION

1. Field of the Invention

The invention generally relates to the area of mass spectroscopic analysis, and in particular to a multi reflecting time-of-flight mass spectrometer (MR-TOF MS) and a method of use.

2. State of the Art

Mass spectrometry is a well recognized tool of analytical chemistry, used for identification and quantitative analysis of various compounds and mixtures. The sensitivity and resolution of such analysis is an important concern for practical use. It has been well recognized that resolution of TOF MS is proportional to the length of the flight path. However, it is recognized it is difficult to increase the flight path while keeping the instrument to a reasonable size. A proposed solution is multi-reflecting time-of-flight mass spectrometers (M-TOF MS). The use of MR-TOF MS became possible after the introduction of an electrostatic ion mirror with time-of-flight focusing properties. U.S. Pat. No. 4,072,862, Soviet Patent No. SU198034 and Sov. J. Tech. Phys. 41 (1971) 1498 disclose an ion mirror to improve the focusing of ion energy in time-of-flight instruments. The use of the ion mirror automatically causes a single folding of ion flight path.

H. Wollnik realized a potential of ion mirrors for implementing a multi-reflecting MR-TOF MS. United Kingdom Patent No. GB2080021 suggests a way of reducing the full length of an instrument by folding the ion path between multiple gridless mirrors. Two rows of such mirrors may be aligned in the same plane or located on two opposite parallel circles (FIG. 1). Introduction of gridless ion mirrors with spatial ion focusing was intended to reduce ion losses and keep the ion beam confined regardless of the number of reflections (more details in U.S. Pat. No. 5,017,780). The gridless mirrors disclosed in GB 2080021 were to provide independence of ion flight time from the ion energy. Two types of MR-TOF MS are disclosed: (a) folded path' scheme, which is equivalent to combining N sequential reflecting TOF MS, and where the flight path is folded along a jig-saw trajectory; and (b) 'coaxial reflecting' scheme, which employs multiple ion reflections between two axially aligned ion mirrors using pulsed ion admission and release. The 'coaxial reflecting' scheme was also described by H. Wollnik et al. in Mass Spec. Rev., 1993, 12, p.109 and was implemented in the work published in the *Int. J. Mass Spectrom. Ion Proc.* 227 (2003) 217. Resolution of 50,000 was achieved after 50 turns in a moderate size (30 cm) TOF MS. Gridless and spatially focusing ion mirrors indeed preserved ions of interest (losses were below factor of 2), though the admitted mass range shrank proportionally with the number of cycles.

Another type, cyclic MR-TOF MS was described in papers by H. Wollnik, Nucl. Instr. Meth., A258 (1987) 289, and Sakurai et al, *Nucl. Instr. Meth.*, A427 (1999) 182. Ions are kept in closed orbits using electrostatic or magnetic deflectors. The scheme employed multiple repetitive cycles, which shrank mass range, similarly to the coaxial reflecting scheme.

A folded path MR-TOF MS using two-dimensional gridless mirrors was disclosed in Soviet Union Patent SU1725289. The MR-TOF MS comprised two identical mirrors, built of bars, were parallel and symmetric with respect to the median plane between the mirrors and also to the plane of the folded ion path (FIG. 2). Mirror geometry and potentials were arranged to focus the ion beam spatially across the plane of the folded ion path and provide second-order time of flight focusing with respect to the ion energy. The ions experienced multiple reflections between the planar mirrors, while slowly drifting towards the detector in a so-called shift direction (here X-axis). The number of cycles and resolution were adjusted by varying the ion injection angle.

Nazarenko's prototype of a 'folded path' MR-TOF MS with planar gridless mirrors, having spatial and time-of-flight focusing properties did not provide ion focusing in the shift direction, thus limiting the number of reflection cycles. Besides, the ion mirrors used in the prototype did not provide time-of-flight focusing with respect to spatial ion spread across the plane of the folded ion path, so that a use of diverging or wide beams would in fact ruin the time-of-flight resolution and would make an extension of flight path pointless. In other words, the scheme failed to deliver an acceptable analyzer and thus the ability of working with real ion sources. Lastly, the Nazarenko prototype has no implication on the type of ion source, nor on efficient ways of coupling between MR-TOF MS and various ion sources, The type of ion source, its spatial and timing characteristics of ion beam, as well as geometrical constrains are the important considerations in the design of MR-TOF MS. Compatibility with single reflecting TOF MS does not automatically mean that a source is well suited for MR-TOF MS. For example, pulsed ion sources, like secondary ion SIMS or matrix-assisted desorption/ionization MALDI, are very compatible with TOF MS and such instruments are characterized by high resolution and moderate ion losses caused by spatial ion divergence. Switching to MR-TOF MS introduces new problems. On one hand, a pulsed nature of such sources suits well an extension of flight time in MR-TOF MS since frequency of ionizing pulses is adjustable. On the other hand, instability of MALDI ions is a limiting factor on flight time extension.

Gaseous ion sources, like electrospray (ESI), atmospheric pressure chemical ionization (APCI) atmospheric pressure photo-ionization (APPI), electron impact (EI), chemical ionization (CI), photo-ionization (CI) or inductively-coupled plasma (ICP) are known to produce stable ions, but they generate intrinsically continuous ion beams, or quasi-continuous ion beams, as in case of recently introduced gas filled MALDI ion source described in U.S. Pat. Nos. 6,331,702, and 6,504,150. TOF MS has been successfully coupled with continuous, and later to quasi-continuous ion sources, after introduction of an orthogonal ion acceleration scheme (o-TOF MS) (see U.S. Pat. No. 5,070,240, WO9103071, Soviet patent SU1681340), efficiently converting continuous ion beams into ion pulsed packets. Gaseous ion sources in combination with a collisional-cooling ion guide (U.S. Pat. No. 4,963,736) produce cold ion beams with low velocity spread along the axis of TOF MS, which help to achieve high TOF resolution in excess of 10,000. However, using MR-TOF MS would reduce the duty cycle of orthogonal acceleration and thus drop sensitivity.

U.S. Pat. No. 6,107,625 suggests that a further increase of resolution of o-TOF MS is mostly limited by a so-called 'turn-around time' and increasing of flight path improves resolution. The '625 patent suggests a coupling of external ESI source to a 'coaxial reflecting' MR-TOF MS via an orthogonal accelerator, combined with an ion mirror and multiple deflectors, such as shown in FIG. 3. To improve the sampling of the continuous ion beam, the interface employs a linear ion trap, storing ions between rare ion pulses. Melvin Park et. al. in the article entitled 'Analytical Figure of Merits of a Multi-Pass Time-of-Flight Mass Spectrometer', extended abstract on ASMS 2001, www.asms.org, MR-TOF MS demonstrated resolution of 60,000 using 6 cycles of reflections in a c.a. 1 m long instrument. However, the use of ion mirrors with grids caused severe ion scattering and ion losses. Coaxial reflecting MR-TOF MS improved resolution but shrank mass range proportionally.

ESI with orthogonal injection has been also coupled to an MR-TOF MS with a folded ion path (see EP 1 237 044 A2 and J. Hoyes et al. in extended abstract ASMS 2000 'A high resolution Orthogonal TOF with selectable drift length' www.asms.org). The invention allows converting an existing commercial o-TOF into a dual reflecting instrument by introducing an additional short reflector between orthogonal source and detector. Energy of continuous ion beam controls number of ion reflections. The 'folded path' MR-TOF MS retains full mass range and considerably improves resolution, but it also reduces duty cycle and geometrical efficiency of ion sampling into the orthogonal accelerator in addition to ion losses and scattering occurring at every pass through meshes in both ion mirrors.

The two above examples demonstrate that a conventional orthogonal acceleration becomes inefficient in MR-TOF MS, particularly at extended flight times. There have been multiple attempts of improving pulsed ion sampling from continuous ion beams, mostly employing ion storage in radio-frequency (RF) traps, like 3-D ion trap (IT) in the paper of B. M. Chien et al. 'The design and performance of an ion trap storage-reflectron time-of-flight mass spectrometer' International Journal of Mass Spectrometry and Ion Processes 131 (1994) 149-119, linear ion trap (LIT) in U.S. Pat. No. 5,763,878, U.S. Pat. No. 5,847,386 (FIGS. 29-31), U.S. Pat. No. 6,111,250 (FIGS. 29-31), U.S. Pat. No. 6,545,268 and WO9930350 or dual LIT (GB2378312) and ring ion trap in paper of A. Luca et al., 'On the combination of a linear field free trap with a time-of-flight mass spectrometer', Rev. Sci. Instrum. V.72, #7 (2001), p 2900-2908. Since all of those solutions compromise temporal and/or spatial spread of ejected ion packets, the orthogonal injection is still the method of choice for singly reflecting TOF MS. Some trapping features are used in an intermediate scheme in U.S. Pat. No. 6,020,586, combining both an ion trapping step and an orthogonal acceleration. Slow ion packets are periodically ejected out of storing ion guide into a synchronized orthogonal accelerator. Compared to conventional o-TOF MS the scheme improves sensitivity, while moderately sacrificing resolution and mass range. The scheme has been coupled to coaxial MR-TOF MS in already described reference by M. Park. However, such instrument does not provide full mass range. It is still desirable to improve conversion of continuous ion beam into ion pulses fully suitable for TOF MS and particularly to multi-reflecting TOF MS.

Multiple reflecting TOF is also employed in tandem mass spectrometer in a co-pending application of one of the author (WO2004008481). A slow MR-TOF MS is used for slow separation of parent ions at a millisecond time scale and a short orthogonal TOF is used for fast mass analysis of fragments at a microsecond time scale. Fast collisional cell is used in-between to fragment ions without smearing time-of-flight separation in the MR-TOF MS. The scheme delivers a novel quality: it allows parallel or 'multi-dimensional' MS-MS analysis, where fragment spectra are simultaneously acquired for multiple parents without mixing them. The scheme has a drawback that parent ions spread in the shift direction which strongly limits acceptance of analyzer and requires smaller divergence of ion beam coming out of the ion source. A higher acceptance of MR-TOF MS is desirable.

Summarizing the above, the MR-TOF MS of the prior art do not have spatial and time of-flight focusing to provide a certain retaining of ion beam along a substantially extended flight path. Most of references describe MR-TOF analyzer without considering their compatibility with ion sources as well as their utility in tandem mass spectrometers. In fact, a limited acceptance of the known MR-TOF analyzers seriously limits such coupling and is expected to cause ion losses at substantially elongated flight paths. Some references are made to actual coupling of MR-TOF MS to continuous ion sources, demonstrating strong improvement of resolution. However, resolution is gained at the expense of losing sensitivity and, in the case of coaxial reflections, of shrinking mass range. Therefore, there is a need for TOF mass spectrometer working with intrinsically continuous or quasi-continuous ion sources, and superior to o-TOF by a set of major analytical characteristics, namely—sensitivity, mass range and resolution. There is also a need for better schemes of coupling TOF MS into tandem mass spectrometers.

SUMMARY OF THE INVENTION

The inventors have realized that acceptance and resolution of MR-TOF MS with two-dimensional planar mirrors could be substantially increased by:

(A) using a periodic set of lenses in a drift space, providing focusing in a shift direction;

(B) employing a geometry of planar mirrors with at least 4 electrodes, which allows not only a known spatial ion focusing and a time-of-flight focusing with regards to energy, but also a novel time-of-flight focusing with regards to spatial spread.

The inventors further realized that an improved acceptance of the MR-TOF MS of the invention allows its efficient coupling to continuous ion sources via an ion storage device. Continuously arriving ions could be stored and pulse ejected out of a storing device, such as ion guide, IT, LIT or a ring ion trap thus saving ions between rare pulses of MR-TOF MS, sparse compared to o-TOF MS.

The MR-TOF MS of the invention provides an advantageous combination of ion optics features, compared to prior art, since:

- It has a full mass range, a property of a 'folded path' scheme;
- It eliminates ion losses on meshes, since mirrors are gridless,
- It efficiently consumes continuous ion beams by storing ions in an ion trap with pulse ion ejection at lower frequency;
- It accepts wide ion beam produced by such traps, since the analyzer has a spatial focusing by periodic lens in a shift direction and spatial focusing by mirrors across the plane of the folded ion path;
- It improves resolution by providing a high-order time-of-flight focusing with respect to energy and, which is novel, to spatial spread of ion packets;
- It tolerates a larger turn-around time of ion packets by extension of the flight time, using folded path in multiple reflections of a well confined ion beam and as a result tolerates schemes with ion storing and pulsing out of various ion traps;

The longer flight time brings another advantage—slower and less expensive detector and data acquisition system, both currently being very costly parts of TOF mass spectrometers.

The invention introduces a completely novel to MR-TOF MS feature—multiple lenses, optimally positioned in the middle of drift space, preferably with a period corresponding to ion shift per integer number of turns. Periodic lenses allow focusing of the beam and, thus, insure a stable confinement of ions along an extended folded ion path. The set of lenses brings the novel quality to MR-TOF: beam spatial and angular spreads stay limited even after an extremely large number of reflections (actually achieved if using reflections in the shift direction as well). Even more, using ion optics simulation the inventors found out that ion motion in the novel MR-TOF efficiently withstands various external distortions, like inaccuracy of geometry, stray electric and magnetic fields of pumps and gauges, as well as space charge of the ion beam itself. The MR-TOF returns ions into vicinity of main trajectory in spite of those distortions, similar to trapping in the potential grove. The feature of periodic lenses allows compact packaging of MR-TOF MS with an extended flight path, combined with a confident full transmission of ion beam.

The lens tuning allows periodic, repeatable focusing in a shift direction, achieved when focal length F matches an integer number of half reflections or quarters of full ion turns (P/4), F=N*P/4. The most tight focusing occurs when F=P/4. Such tight focusing is advantageous for minimizing shift per turn and making instrument compact. It is important that even under the condition of such tight focusing lenses remain weak because of a relatively long ion path per turn, and therefore they introduce only minor incorrigible time-of-flight aberrations with respect to the ion spatial spread in the plane of the folded ion path. Planar lenses, substantially elongated across the plain of ion path, provide an advantage of fairly independent tuning of spatial focusing by ion mirrors and by periodic lenses, since they focus in different directions. Besides, such lenses may also incorporate steering by using asymmetric voltages on side plates.

The invention allows further increase of the flight path length by employing reflections in a shift direction. Such reflections can be achieved, for example, by deflection plates, located on the sides of shift path in the middle of drift space between the mirrors. Deflection plates could operate constantly or in a pulsed mode to allow ion gating. A single reflection does not affect mass range, while a further increase of the flight path by multiple reflections in shift direction is achieved at the expense of mass range. The deflection plates could be also used to bypass the analyzer and to steer ions into a receiver.

Novel focusing properties of the mirrors of the invention are provided by choosing a proper distance between the mirrors and adjustment of electrode potentials. Such adjustment results in the 3rd-order time-of-flight focusing on ion energy, 2nd-order time-of-flight focusing with respect to the spatial ion spread across the plane of the folded ion path and spatial focusing across the said plane. The inventors realized that elimination of high-order time-of-flight aberrations is stable with respect to assembly defects as well as to moderate variations of the drift lengths and electrode potentials. Therefore, a high resolving power could be obtained by tuning of novel MR-TOF MS while adjusting only one electrode potential, in fact, varying one parameter—a linear dependence of the ion flight time on the ion energy.

The previously described focusing properties are realized, for example, in planar 4-electrode mirrors, composed of thick square frames, substantially elongated in a shift direction. The desired field structure also could be made using thin plates with slots, bars, cylinders, or curved electrodes. The edges of two-dimensional mirrors could be efficiently terminated using printed circuit boards to shorten the total physical length of the MR-TOF MS. Having more electrodes is very likely to further improve mirror parameters, but complicates the system.

In a preferred mode the ion source and the ion detector are located in the drift space between the mirrors. In such configuration the folded ion path remains far from mirror edges and the mirrors can be operated in a static mode to achieve better stability and mass accuracy of the MR-TOF MS. However, the invention is well compatible with a pulsed ion admission from external source or ion release through ion mirrors in order to couple the MR-TOF MS with external ion sources or ion receivers and to avoid beam passage through fringing fields of mirror edges.

The invention is applicable to various ion sources, including pulsed ion sources, like MAIDI or SIMS, quasi- continuous ion sources, like MALDI with collisional cooling, as well as intrinsically continuous ion sources like ESI, EI, CI, PI, ICP or a fragmenting cell of a tandem mass spectrometer. All continuous or quasi-continuous ion sources preferably operate with an ion guide.

As mentioned earlier, having a much wider acceptance, the MR-TOF MS of the invention can be used in conjunction with an ion storing device, avoiding ion losses between infrequent accelerating pulses. Such ion storing can occur in gas filled radio frequency (RF) storing devices of various kinds, including ion guides, RF channels, ring electrode traps, wire guides, IT or LIT, incorporated either into an ion source itself or into an accelerator of the MR-TOF MS. The invention employs either:

a direct acceleration out of an ion storing device, axial or orthogonal, or a dual acceleration scheme, where slow ion pulse is ejected out of the storing device with consecutive pulsed acceleration, axial or orthogonal, such accelerator may be made either as a DC accelerator or an RF ion guide switching between RF transmitting mode and DC pulsing mode, or a dual storage scheme, where slow ion pulses are released from a first storing trap and admitted into the second trap usually operated at a lower gas pressure.

Ion ejection out of the second storing device can be also made axially or orthogonally, or via an additional accelerator, axial or an orthogonal.

Some compromises in parameters of ion packets are acceptable because of substantial extension of flight path and wide acceptance of the novel MR-TOF MS.

The preferred embodiment of the invention employs the latter- more complex, but advantageous scheme of dual ion storage. Ion guides are preferred choice for both storage devices. It is preferable using an additional set of pulsed electrodes, whose field well penetrates into ion storage area of the second ion guide and allows fast ion ejection in axial direction with a small turn around time, while providing fairly uniform accelerating field and a moderate ion divergence. Compared to orthogonal acceleration scheme the invention provides an almost complete utilization of continuous ion beam. Some increase of the turn around time is compensated by an extension of the flight path.

The invention suggests several novel ion storing devices, such as a hybrid ion trap, composed of ion guide and a 3-D ion trap with an open ring electrode. Simulations of the segmented analog have shown feasibility of such trap for preparation of ions for MR-TOF analysis. Another novel device comprises a linear ion trap with auxiliary electrodes. Both ion trapping and axial ejection could be achieved by pulsing voltages on separate set of electrodes, and not having any RF signals on them.

The invention is expected to provide more intense ion pulses and as a result dynamic range and life time of the ion detector become an important issue. Multiple solutions are known in the art, including ion suppression either at ion storage, or mass separation or detection stages. The known strategies include automatic adjustment of ion intensity or mass filtering of unwanted beam components. Dynamic range is enhanced by using a secondary electron multiplier (SEM) and analog to digital converters (ADC) for data acquisition. A specific of the invention is in longer pulse duration, allowing lower bandwidth and somewhat easier solutions of the above problems.

The scheme is expected to provide a complete utilization of continuous or quasi-continuous ion beam as well as an improved resolution, in the range of R~100,000. The MR-TOF MS could be used either as a stand-alone instrument, or as a part of LC-MS or MS-MS tandem, first of all expected as a second analyzer of fragment ions, combined with any know mass separator of parent ions and a with any known kind of fragmenting cell.

The MR-TOF MS of the invention could be also used as a first, separating mass spectrometer in a tandem mass spectrometer arrangement. The advantage of using MR-TOF becomes apparent in a co-pending patent by one of the authors. The co-pending invention suggests using slow TOF1 for ion separation, combined with a fast TOF2 for fragment analysis. The arrangement allows parallel analysis of multiple precursors per single pulse out of ion source. Current invention allows particularly long separation in MR-TOF MS, as well as separation at low and medium energy of ion beam, tight focusing of the beam and precise control of ion beam location, useful while directing the beam into a fragmenting cell.

An enhanced transmission and enhanced resolution of MR-TOF could be also used in both stages of mass spectrometric analysis. In this case a prolonged flight time in the second shoulder requires selection of a single precursor by a timed ion selector, thus loosing opportunity of parallel MS-MS analysis, but instead providing for high specificity, resolution and mass accuracy of MS-MS analysis. Multistage MSn analysis could be accomplished in an instrument with a single MR-TOF analyzer. For example, the same analyzer could be used both for parent separation, daughter separation and grand-daughter ion analysis if the collisional cell reverts direction of ion flow and timed ion selector is used between MR-TOF and fragmentation cell. Ions are passed between MR TOF analyzer and collisional cell back and forth.

Both modes of parallel MS-MS analysis and of high resolution MS-MS analysis could be accomplished in a single versatile instrument by adjusting flight path and acceleration voltage, preferably on both MR-TOF. Reducing voltage in a first analyzer and reducing flight path (by pulse deflecting ion beam and using fewer reflections) in the second analyzer would provide such versatility.

Ceriainly, the utility of MR-TOF MS of the invention spreads onto a much wider variety of devices and methods. As an example, MR-TOF MS could be combined with any up-front sample separation in various types of chromatography, or mass spectrometric separation in any type of external mass spectrometer or ion mobility spectrometer. A variety of gas filled storage devices and gas filled fragmentation cells employed in various embodiments could be as well converted into gaseous ion reactors. Such reactors could be useful for example for employing ion-molecular reactions in ICP method to enhancing isotopic sensitivity, could be using ion-ion reactions between multiply charged ions and ions of the opposite polarity, either for charge reduction or selective fragmentation, so as such reactors could be used for electron capture dissociation of multiply charge ions.

BRIEF DESCRIPTION OF THE DRAWINGS

For a more complete understanding of the present invention, reference is now made to the following drawings in which:

FIG. 7 shows a generalized schematic of ion sampling from continuous ion sources into the MR-TOF MS of the invention using an intermediate ion storage device, wherein:

FIG. 7A shows a block diagram of the pulsed ion source in the MR-TOF MS;

FIG. 7B shows details of the electrospray ion source as an example of the continuous ion source;

FIG. 7C shows details of the MALDI ion source with collisional dampening as an example of the quasi-continuous ion source;

FIG. 7D shows details of the intermediate storage ion guide;

Figure 9:
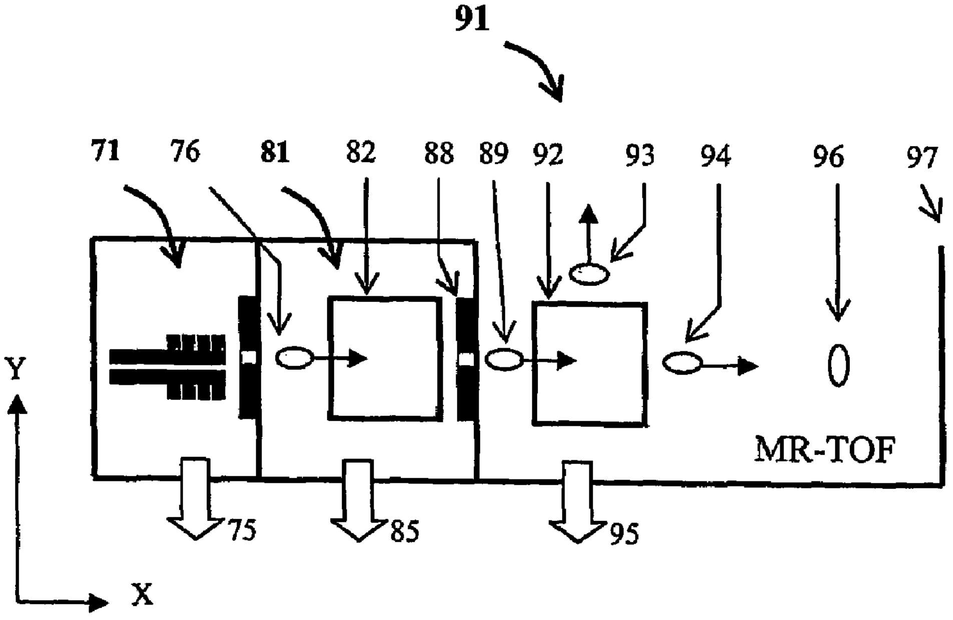
Figure 10:
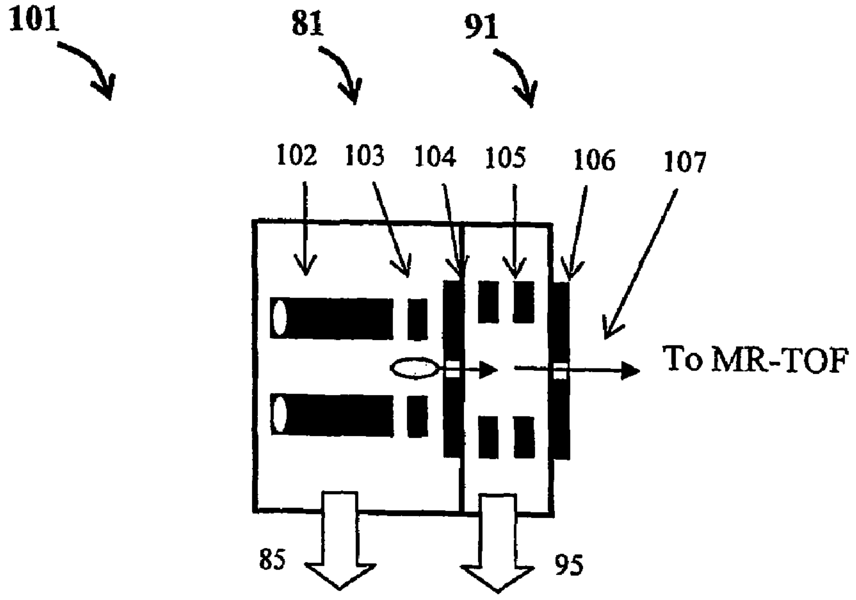

FIG; 8 shows a schematic of a second ion storage device and of the ion accelerator;

FIG. 9 shows a block diagram of dual ion storage with axial ejection and with an optional accelerator;

FIG. 10 shows a particular arrangement of a second storage device providing a pulsed axial ion ejection.

Figure 11:
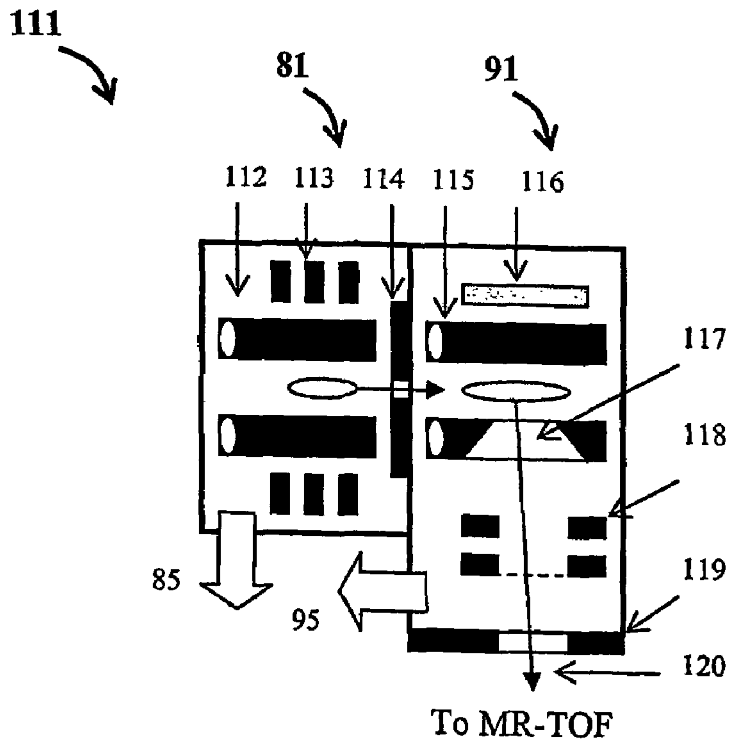
Figure 12:
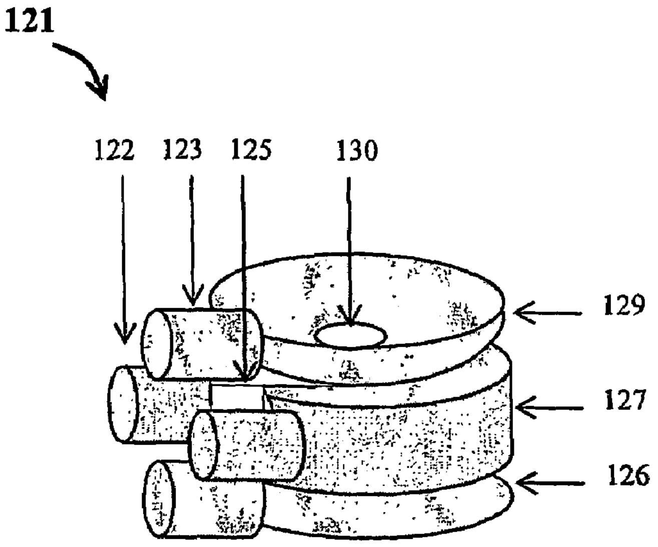

FIG. 11 shows an arrangement with orthogonal acceleration out of non-storing ion guide FIG. 12 shows a particular arrangement of the second storage device forming a hybrid of a quadrupole ion guide and 3-D quadrupole ion trap.

Figure 13:
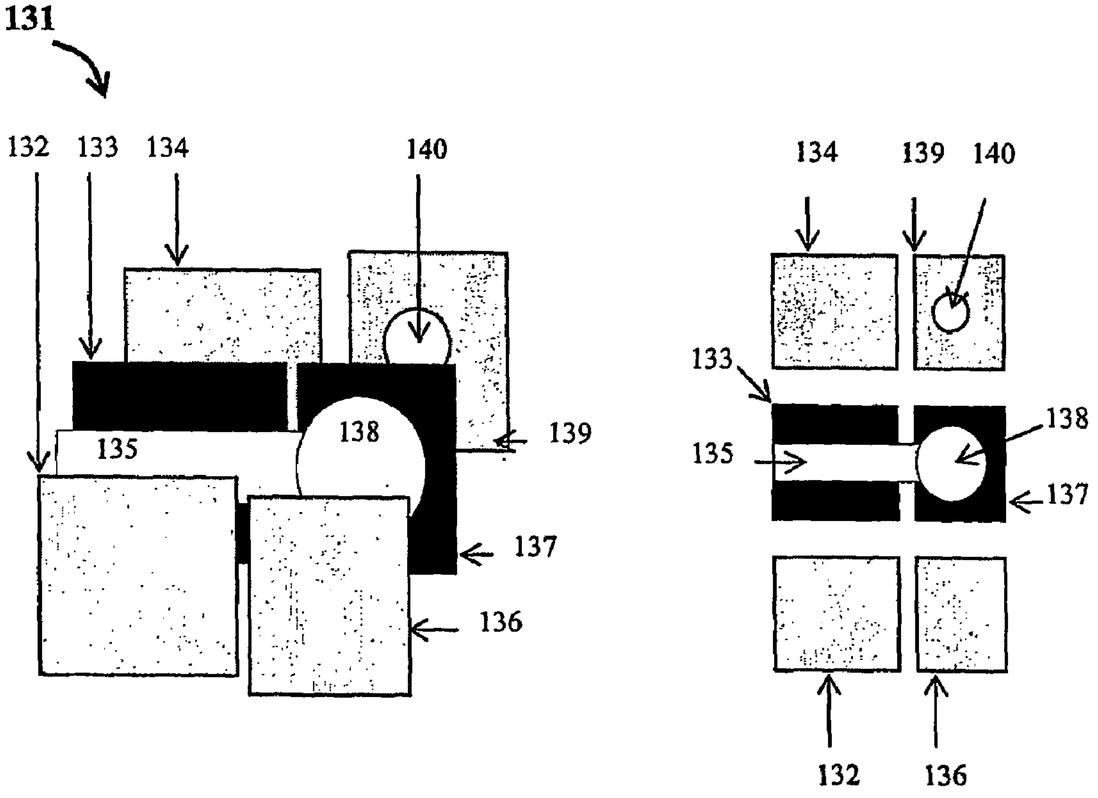

FIG. 13 shows a segmented analog of the hybrid trap.

Figure 14:
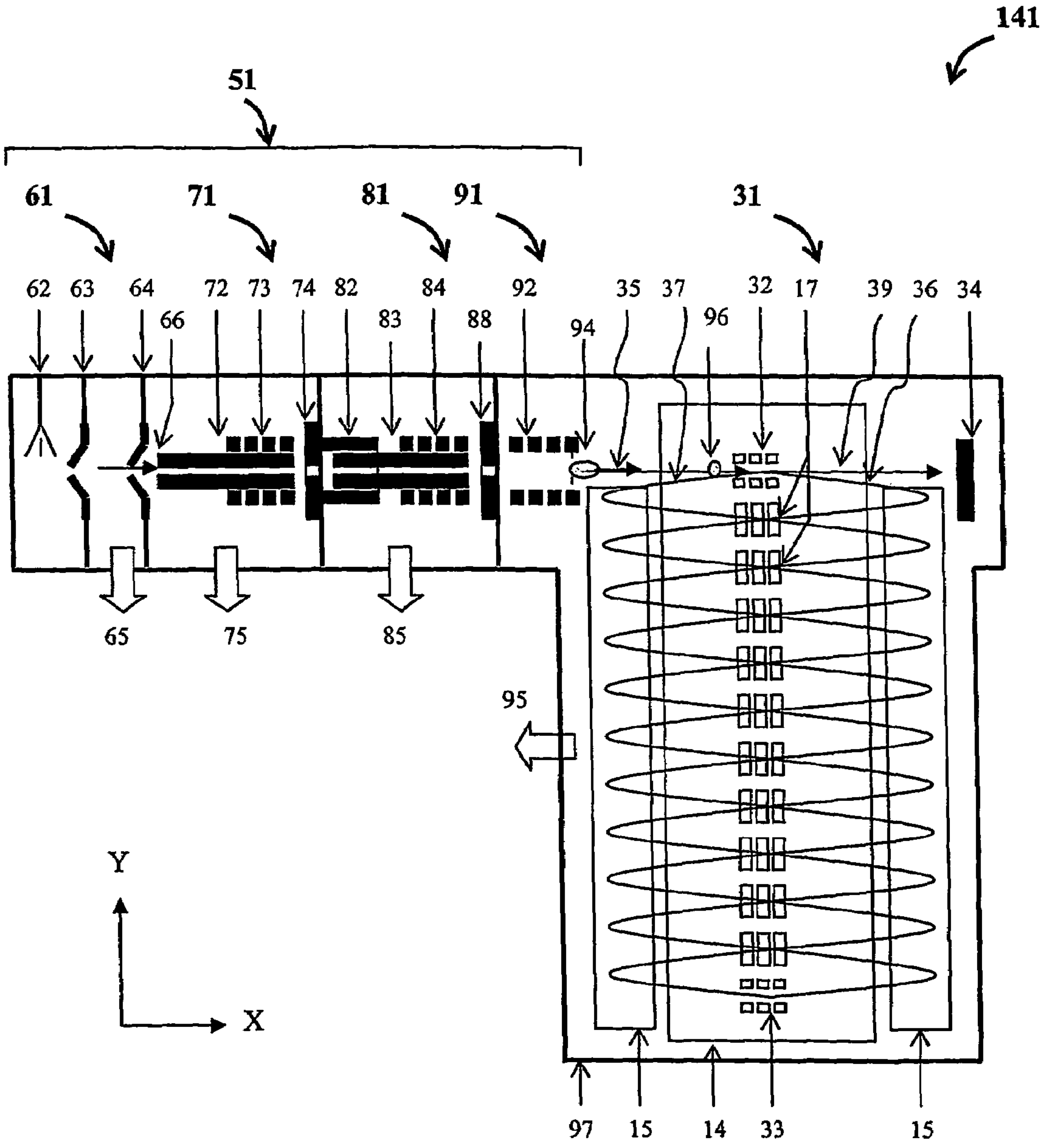

FIG. 14 shows the detailed schematics of the preferred embodiment of MR-TOF MS of the invention.

Figure 15:
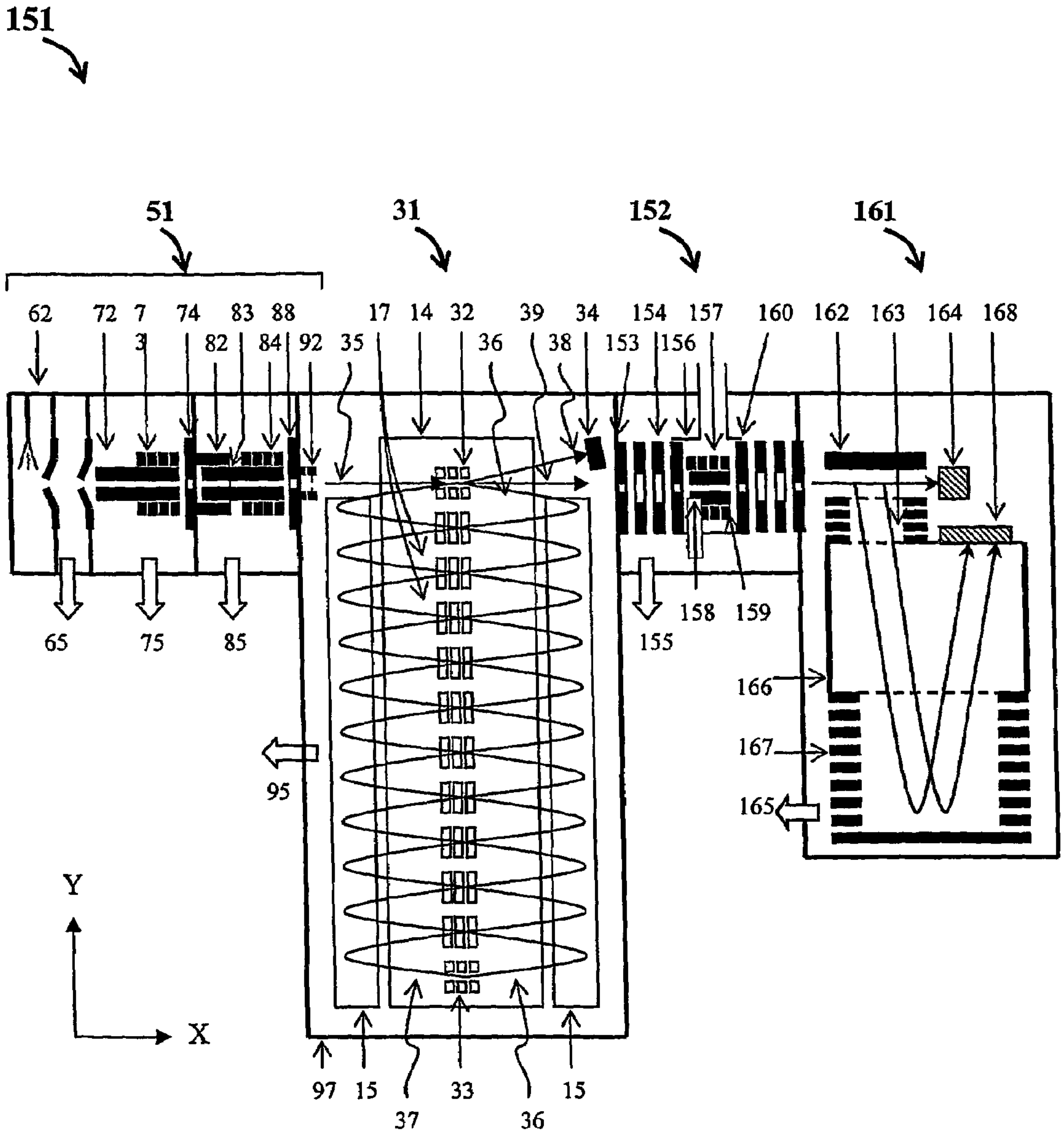

FIG. 15 shows the schematics of the preferred embodiment of tandem mass spectrometer with parallel MS-MS analysis and including MR-TOF MS as a first MS stage of slow separation of parent ions.

Figure 16:
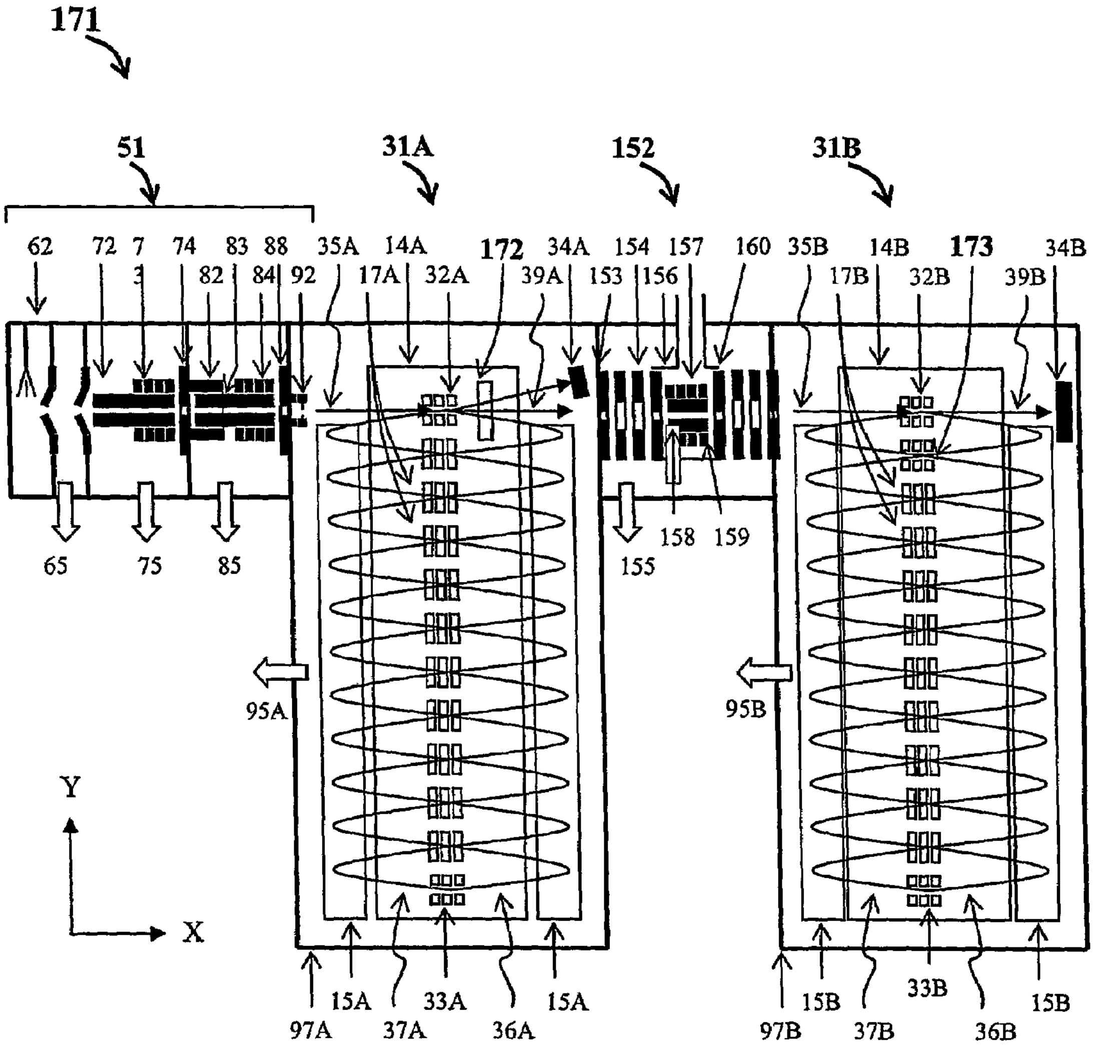

FIG. 16 shows the schematics of the preferred embodiment of tandem mass spectrometer with MR-TOF MS at both MS stages providing a versatile switching between high throughput and high-resolution modes of MS-MS analysis.

Figure 17:
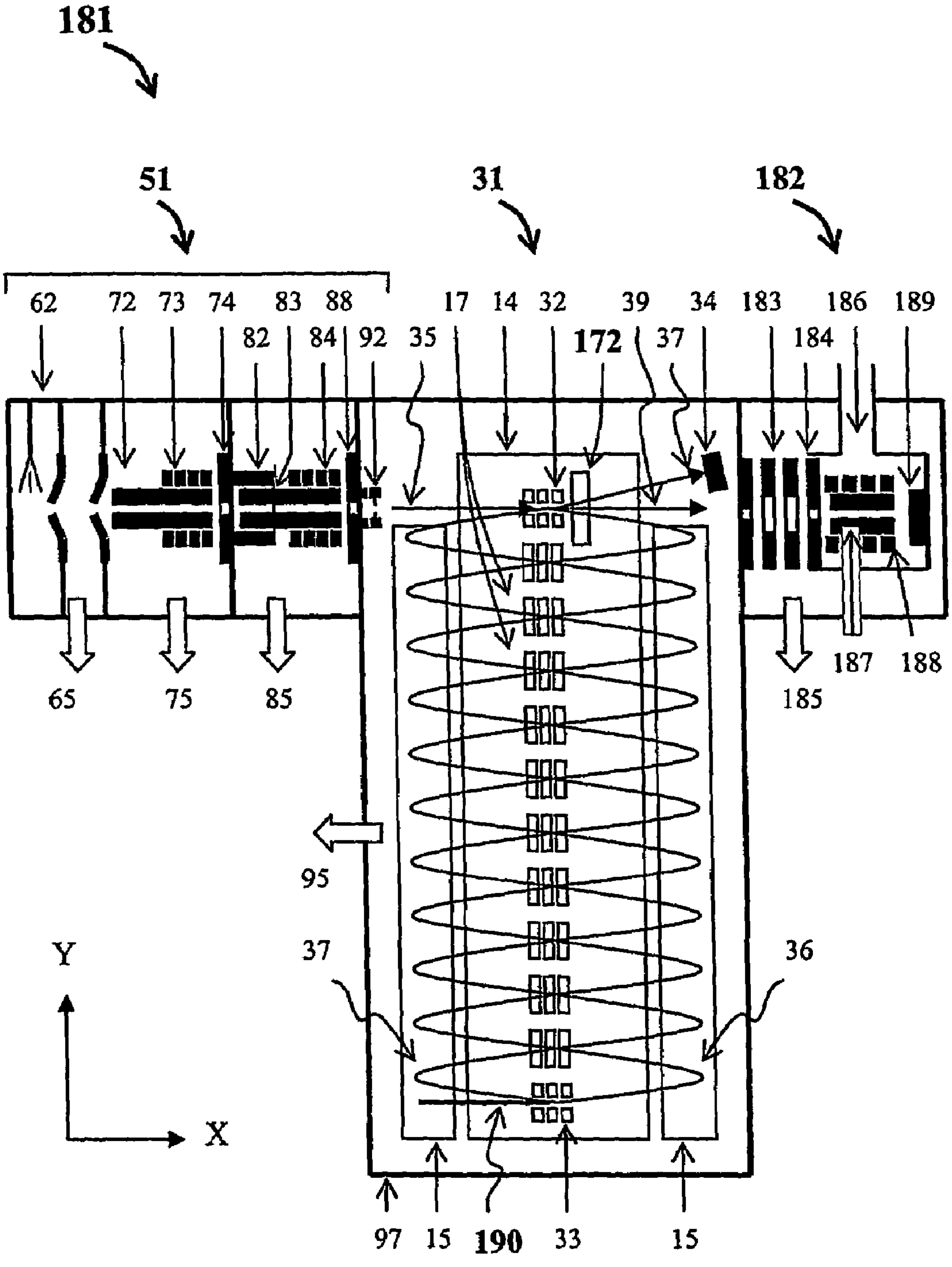

FIG. 17 shows the preferred embodiment of mass spectrometer for multistage MSn analysis, and employing a single MR-TOF MS analyzer and a fragmentation cell, reverting ion flow.

DETAILED DESCRIPTION OF PREFERRED EMBODIMENTS

The present invention relates generally to the area of mass-spectroscopic analysis, and more particularly is concerned with the apparatus, including a multi reflecting time-of-flight mass spectrometer (MR TOF MS). More specifically, the invention improves resolution and sensitivity of planar and gridless MR-TOF MS by employing a novel arrangement and control of mirror electrodes in combination with a periodic set of lenses in a drift space. Because of improved spatial and time focusing, the MR-TOF MS of the invention has a wider acceptance and confident confinement of ion beam along an extended folded ion path. As a result, the MR-TOF MS of the invention can be efficiently coupled to continuous ion sources via an ion storage device, thus saving on duty cycle of ion sampling. The MR-TOF MS of the invention is suggested for use in tandem mass spectrometers, either as a first slow separator in tandems with two-dimensional parallel MS-MS analysis or as a tandem employing MR-TOF MS at both stages of analysis.

Figure 1:
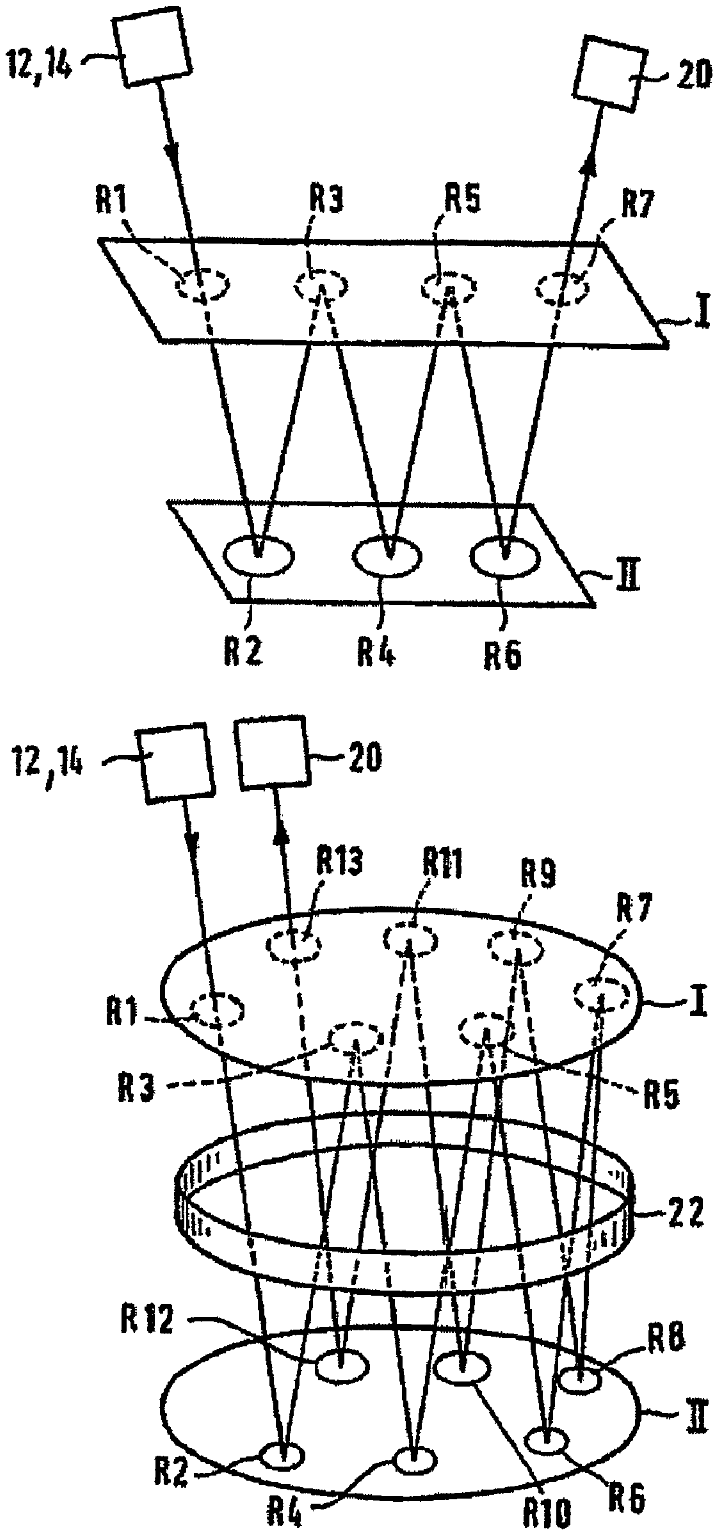
FIG. 1 shows a multi-reflecting time-of-flight mass spectrometer (MR-TOF MS) of prior art, by Wollnik et al, GB patent No 2080021 (FIG. 3 and FIG. 4 of the GB patent).
Figure 3:
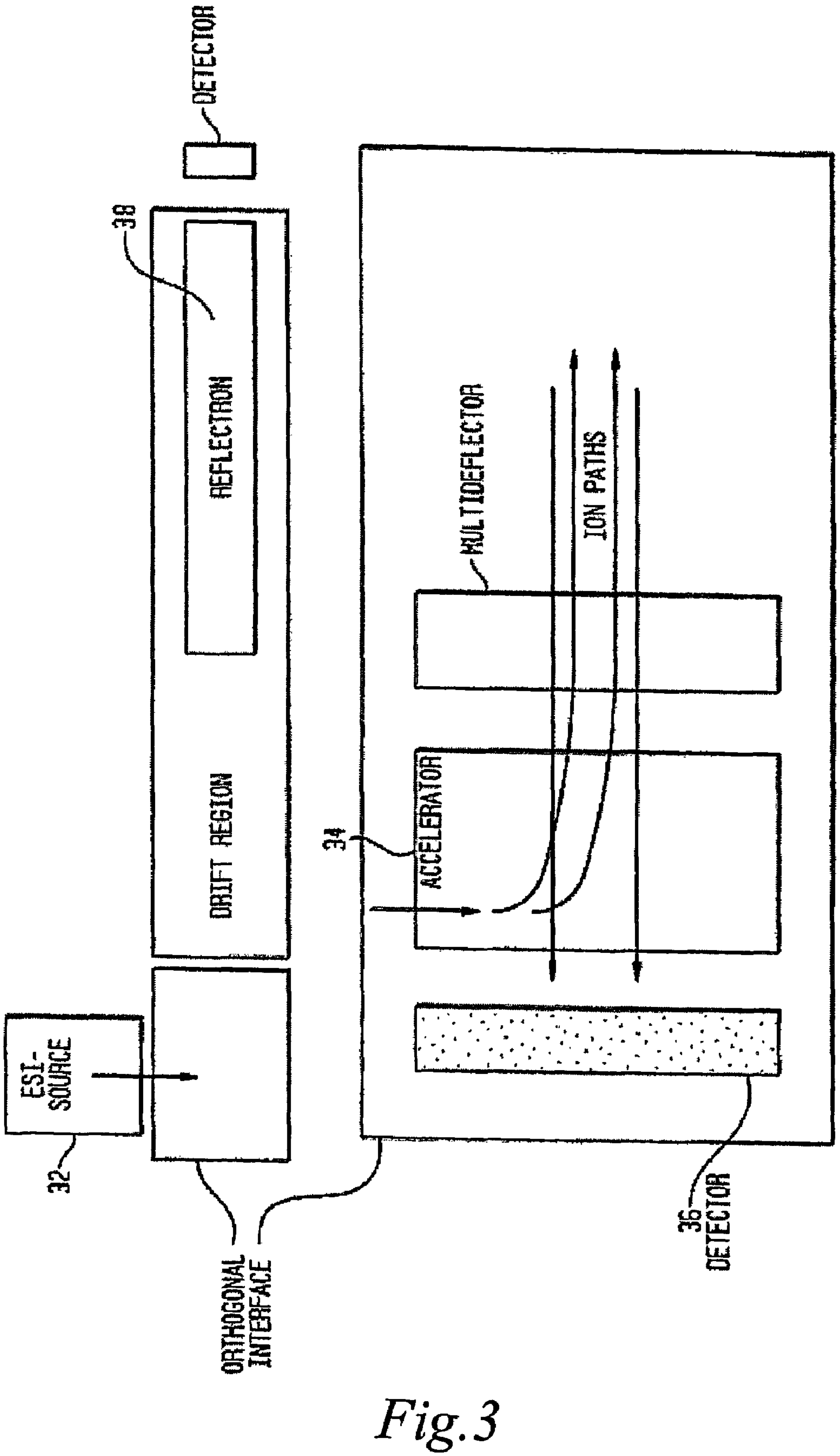
FIG. 3 shows a 'coaxial reflecting' MR-TOF MS of prior art by M. Park, U.S. Pat. No. 6,107,625.
Figure 4:
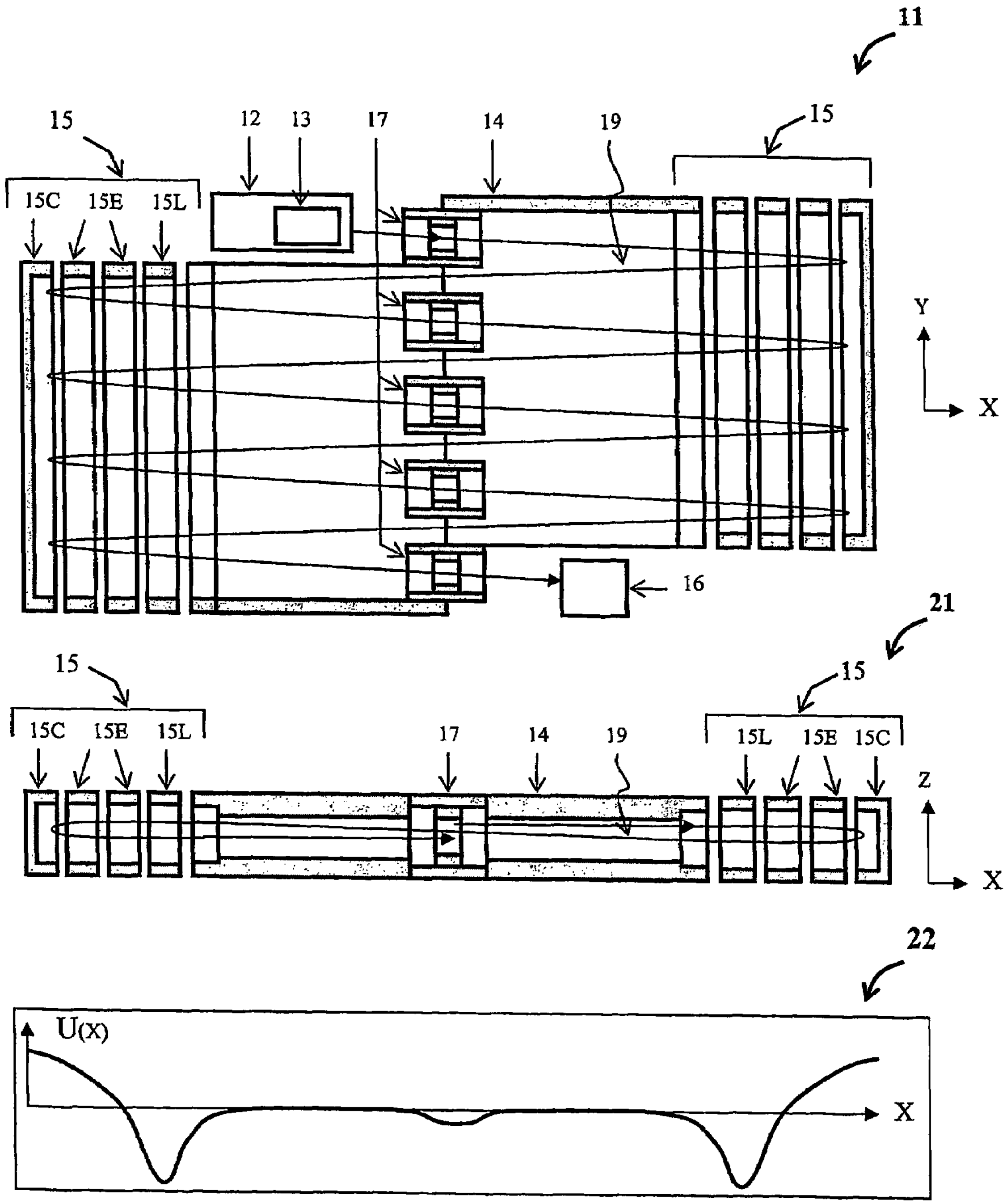
FIG. 4 shows a schematic of the preferred embodiment of the MR-TOF MS of the invention, with details on novel periodic lenses.

FIG. 1 shows a multi-reflecting time-of-flight mass spectrometer (MR-TOF MS) of prior art, by Wollnik et al., GB patent No 2080021 (FIG. 3 and FIG. 4 of the GB patent). In a time-of-flight mass spectrometer ions of different masses and energies are emitted by a source 12. The flight path of ions to a collector 20 is folded by arranging for multiple reflections of the ions by mirrors R1, R2, . . . Rn. The mirrors are such that the ion flight time is independent of ion energy. The patent shows two geometrical arrangements of multiple axially symmetric ion mirrors. In both arrangements ion mirrors are located in two parallel planes I and II and are aligned along the surface of ion path. In one arrangement this surface is a plane and in another one it is a cylinder. Note that ions travel at an angle to optical axis of ion mirrors which induces additional time-of-flight aberrations and thus considerably complicates achieving high resolution.

Figure 2:
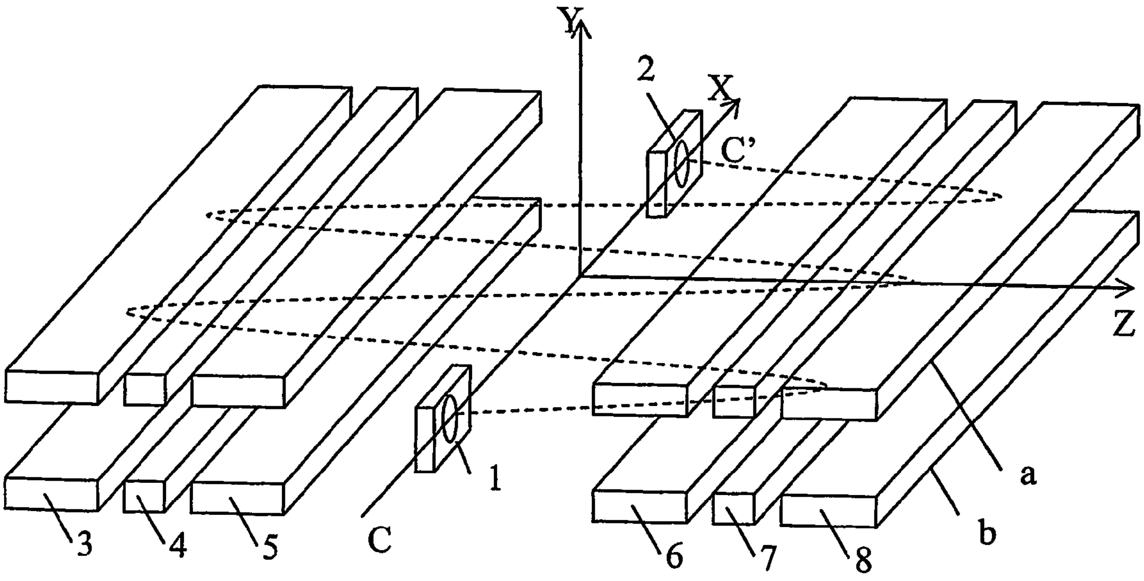
FIG. 2 shows a 'folded path' MR-TOF MS of a prototype by Nazarenko et al., SU1725289.

FIG. 2 shows a 'folded path' MR-TOF MS of a prototype by Nazarenko et al., described in Russian patent SU1725289. The MR-TOF MS of the patent comprises two gridless electrostatic mirrors, each composed of three electrodes 3, 4 and 5 for one mirror, and 6, 7 and 8 for another mirror. Each electrode is made of a pair of parallel plates 'a' and 'b', symmetric with respect to the 'central' plane XZ. A source 1 and receiver 2 are located in the drift space between the said ion mirrors. The mirrors provide multiple ion reflections. Number of reflections is adjusted by moving the ion source along the X-axis relative to the detector. The patent describes a type of ion focusing which is achieved on every ion turn, achieving a spatial ion focusing in Y direction and a second order time of flight focusing with respect to ion energy.

Note that the prototype provides no ion focusing in the shift direction, thus essentially limiting the number of reflection cycles. It also does not provide time-of-flight focusing with respect to spatial ion spread in Y direction. Therefore, the MR-TOF MS of the prototype fails delivering wide acceptance of analyzer and thus an ability of working with real ion sources. Finally, the prototype has no implication on the type of ion source, and on efficient ways of coupling of MR-TOF MS to various ion sources.

FIG. 3 shows a 'coaxial reflecting' MR-TOF MS of prior art by M. Park, U.S. Pat. No. 6,107,625. The invention comprises two electrostatic reflectors 34 and 38, positioned coaxially with respect to one another such that ions generated by an ion source 32 can be reflected back and forth between reflectors. The first reflecting device 34 combines functions of an orthogonal accelerator and of an ion mirror. After multiple ion reflections either of mirrors is rapidly switched off to allow the ions to pass through the reflector and onto an ion detector 36. The patent teaches a way of coupling of continuous ion source to an MR-TOF MS. The described apparatus indeed achieves high resolution within a small size instrument. However, an employed 'coaxial reflecting' scheme strongly reduces mass range and decreases the duty cycle of ion sampling from a continuous ion beam. Meshes cause substantial ion losses. Duty cycle is improved in a later work by author after introducing a storing linear ion trap (LIT) into the ion source.

FIG. 4 shows a schematic of the preferred embodiment of the MR-TOF MS of the invention, with details on novel periodic lenses. The MR-TOF MS 11 comprises a pulsed ion source 12 with a built in accelerator 13, an ion receiver 16, a set of two gridless ion mirrors 15, parallel to each other and substantially elongated in a 'shift' direction, denoted here as Y axis, a field-free space 14 between the said mirrors and a set of multiple lenses 17, positioned in the said drift space.

The above elements are arranged to provide a folded ion path 19 between the ion source 12 and the ion receiver 16, the said ion path being combined of multiple reflections between the ion mirrors 15 and of an ion drift in the shift Y direction. The shift is arranged by slight tilting, mechanically or electronically, of the incoming ion packets with respect to the X-axis. The lenses 17 are positioned along the Y-axis with a period corresponding to ion shift per integer number of ion reflections. The preferred embodiment strongly enhances acceptance of the MR-TOF MS by providing novel ion optics properties—periodic focusing by lenses 17 in the shift Y direction, complementing a periodic spatial focusing in the orthogonal Z direction, provided by planar gridless ion mirrors. Those ion optics properties as well as improved time-of-flight focusing by specially designed ion mirrors of the invention are discussed below in more details.

Incorporation of periodic lenses is a completely novel feature in MR-TOF MS, which provides stable retention of the ions along the main jigsaw folded ion path. The lens tuning allows periodic, repeatable focusing in a shift direction, achieved when focal length F matches an integer number of half reflections or quarters of full ion turns (P/4), F=N*P/4. The tightest focusing occurs when F=P/4. Such tight focusing is advantageous for minimizing shift per turn and making instrument compact. It is important that even under the condition of such tight focusing lenses remain weak because of a relatively long ion path per turn, and therefore they introduce only minor incorrigible time-of-flight aberrations with respect to the ion spatial spread in the plane of the folded ion path. Preferably lenses are lenses, i.e. substantially elongated across the plain of ion path, to provide an advantage of fairly independent tuning of spatial focusing by ion mirrors and lenses across the plane of the folded ion path and in this plane, respectively. Such lenses may also incorporate steering by using asymmetric voltages on the side plates.

The set of periodic lenses brings the novel quality to MR TOF: the ion beam remains confined even after an extremely large number of reflections (actually achieved if using reflections in the shift direction). Even more, using ion optics simulation the inventors found out that ion motion in the novel MR-TOF efficiently withstands external distortions, like inaccuracies of geometry, stray electric and magnetic fields of surfaces, pumps and gauges, as well as space charge of the ion beam. The MR-TOF returns ions into vicinity of main trajectory in spite of those distortions. This effect is equivalent to trapping in the potential well. The feature of periodic lenses allows compact packaging of MR-TOF MS with an extended flight path, combined with confident full transmission of ion beam.

FIG. 4 also shows a side view 21 of the same preferred embodiment as well as an axial potential distribution 22 in the analyzer of the preferred MR-TOP MS. Preferably, the mirrors 15 are symmetric with respect to the XY plane and preferably, though not necessarily, identical with respect to each other, i.e. are symmetric around the YZ plane. Preferably, the mirrors 15 are composed of at least 4 electrodes, comprising a lens electrode 15L, two electrodes 15E and a cap electrode 15C in addition to a specially formed edge of the drift space 14. As mentioned, the mirrors are substantially elongated in a shift direction, forming a two-dimensional electrostatic field around the area of the folded ion path 19.

Novel focusing properties of the mirrors in the invention are provided by choosing a proper distance between the mirrors and adjustment of electrode potentials. The inventors have found such parameters by ion optics simulations with a built-in calculation of derivatives and also with a built-in automatic optimization block. Working with such a proprietary program, the inventors have formulated some general trends of optimization algorithms and several key requirements to the ion optics of ion mirrors. For example, for symmetric MR-TOF MS with two identical mirrors, each mirror should comprise at least 4 electrodes in order to have 5 independently tuned parameters:

a) 3 parameters (optimally two electrode potentials and the drift length between the mirrors) are chosen to provide a periodic (after each reflection) third-order time-of-flight focusing with respect to energy, i.e. the tuning allows eliminating the first, second and third-order derivatives of the ion flight time on the ion energy;

b) one parameter (optimally the potential of the 'incorporated lens' electrode closest to the drift space) provides a so-called 'parallel-to-point' spatial focusing across the plane of the folded ion path. Such term means that a parallel ion packet, starting in the middle of drift space, will be focused into a point after half a turn and will be converted back into a parallel ion packet after a full turn. Advantageously this focusing is arranged so that ions of the packet also intersect a plane of ion path in the vicinity of turning point;

c) one remaining parameter is adjusted to eliminate the second-order derivative of the flight time of the just mentioned ion packet with respect to the initial ion offset from the plane of the folded ion path.

If both conditions (b) and (c) are satisfied, then the symmetry of the mirror arrangement automatically leads to elimination of all time-of-flight aberrations up to the second order on the initial coordinate and angular spread across the plane of the folded ion path after each full turn, i.e. after an even number of reflections.

The inventors realized that elimination of high-order time-of-flight aberrations is stable with respect to assembly defects as well as to moderate variations of the drift lengths and electrode potentials. Therefore, a high resolving power could be obtained by tuning of novel MR-TOF MS while adjusting only one electrode potential, in fact, varying one parameter—a linear dependence of the ion flight time on the ion energy.

Figure 5:
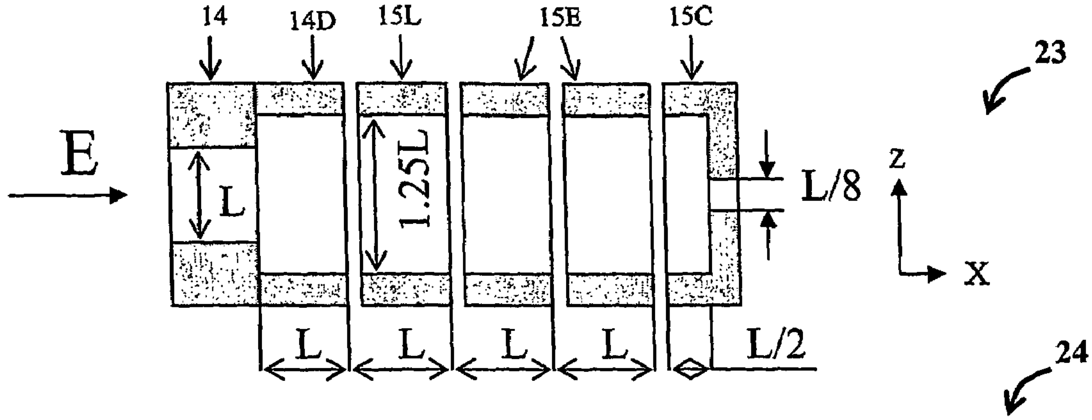
FIG. 5 shows MR TOF analyzer geometry and potentials of ion mirrors of the preferred embodiment of the invention.
Figure 5:
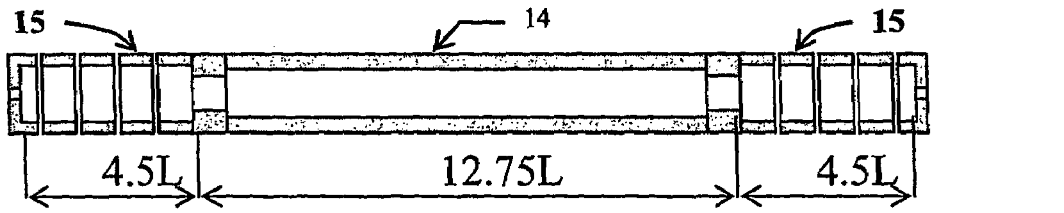
Figure 5:
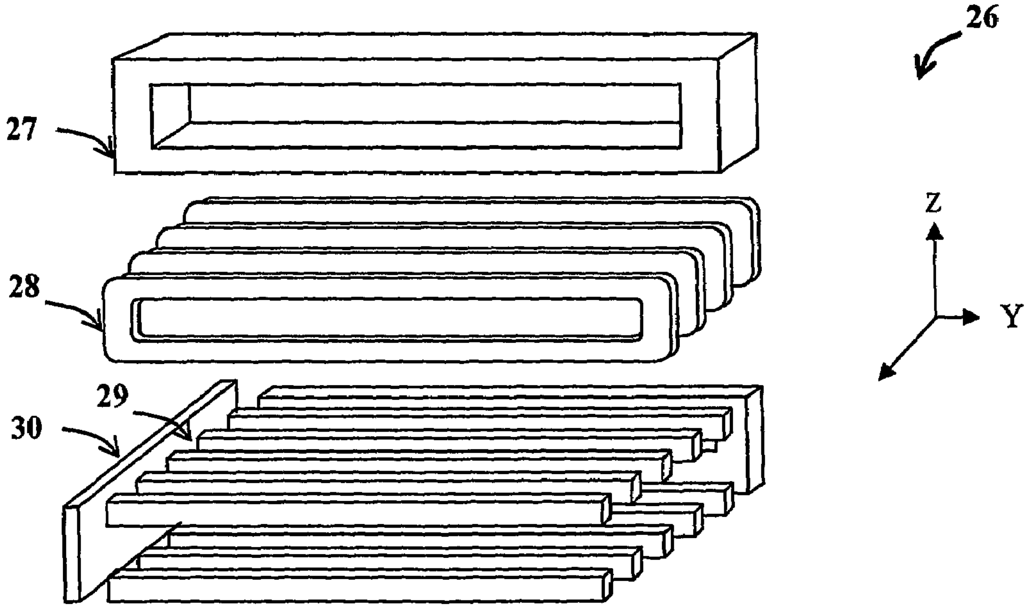

FIG. 5 shows particular examples of geometry and voltages of MR-TOF analyzer of the invention; which provide the previously described high order spatial and time-of-flight focusing. The view 23 shows dimensions of the particular four-electrode mirror with dimensions being normalized to a length L of typical electrode. The electrodes of the mirror are denoted as 15L for lens electrode, 15E for two middle electrodes and 15C for a cap electrode. Similarly, view 24 shows dimensions of the drift space and of the entire mirror, while view 25 shows potentials on electrodes of the same particular MR-TOF MS. The potentials are normalized to the nominal energy E of the ion beam. The analyzer forms an axial potential distribution similar to one shown on the view 22 of FIG. 4.

The elongated two-dimensional structure of ion mirror could be formed using electrodes of various shapes. The view 26 of FIG. 5 shows few possible types of electrode geometry, including elongated square frames, thin plates with elongated slots, square bars and not shown types formed by parallel rods, curved electrodes, 'like cones, hyperbolas, etc.' The inventors also expect that a desired structure of electric field could be synthesized using less number of two-dimensionally shaped electrodes.

To preserve a two-dimensional field structure, a special treatment of a boundary problem is required. To avoid distortions of the field structure the mirrors are either made much longer than the total shift of the folded ion path, or employ special devices, like for example a fine-structured printed circuit boards (PCB) 30 with a shape of electrodes repeating a shape of equipotential lines of the mirror field. In our ion optics simulations we found that a simple adjustment of width of the lens edge allows noticeable reduction of fringing field penetration. Similar results could be obtained by introducing an additional edge electrode, for example as a rib of the lens electrode 15L.

Figure 6:
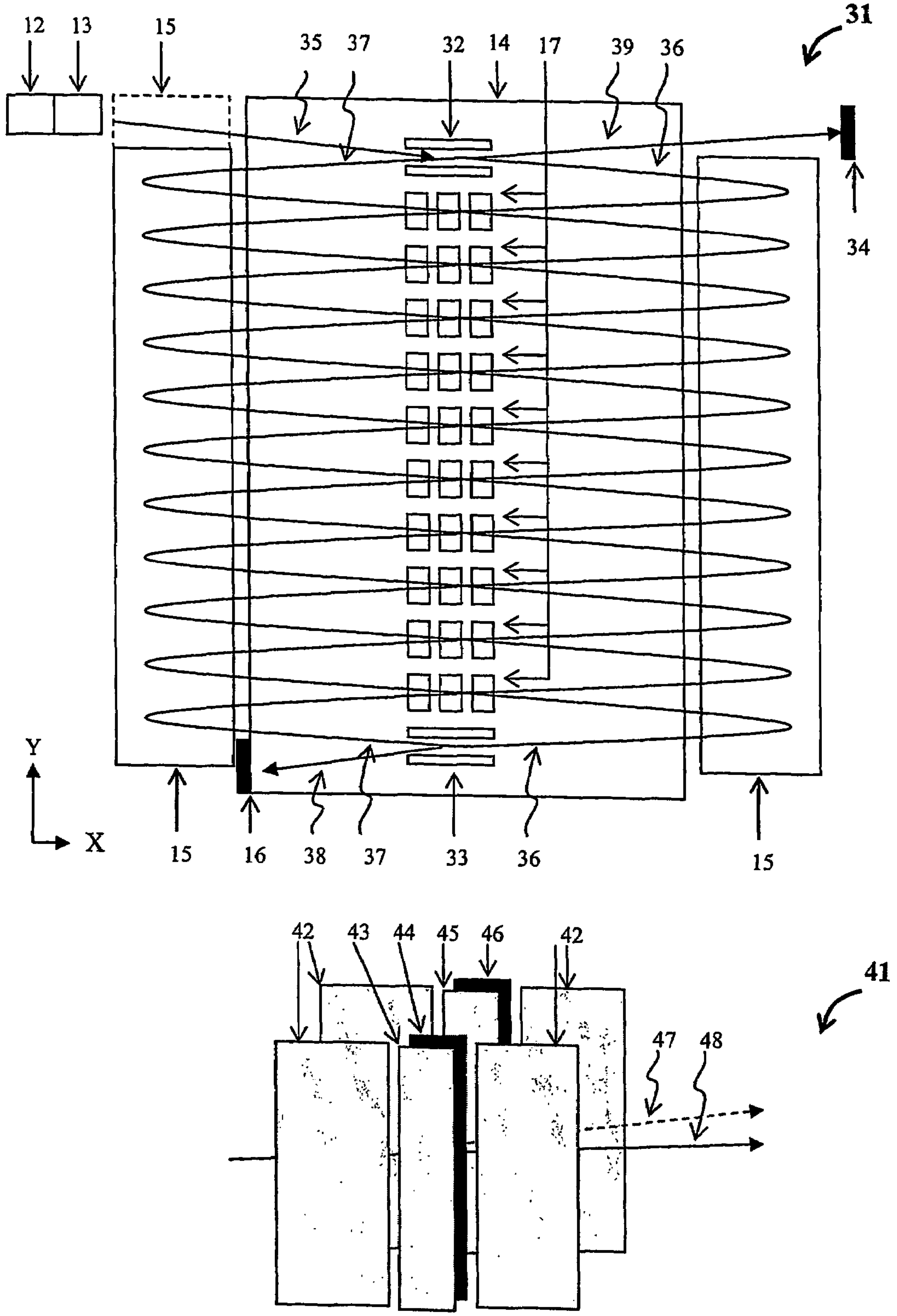
FIG. 6 shows a schematic and principles of ion path extension by edge ion reflections in the shift direction.

FIG. 6 shows a schematic and principles of ion path extension by ion reflections in the shift direction within the MR-TOF analyzer of the preferred embodiment of the invention. In addition to standard components, which are shown using previous numbers, the embodiment 31 comprises steering devices 32 and 33 and an optional in-line ion receiver 34. The incident ion packet 35 can be either deflected onto an additional detector 34 or steered into the MR-TOF MS along the folded path 36. On the other end of the shift axis Y the second steering device 33 can either release ions onto the ion receiver 16 along the trajectory 38 or steer the ion packet again into the MR-TOF MS along the folded ion path 37.

In operation, in a particular regime, when the entrance steering 32 is disabled and the exit steering 33 is constantly on, the MR-TOF MS retains a non-repeating folded ion path and thus retains full mass range of mass spectrometric analysis, while doubling the flight path. The entrance steering can be used to by-pass analyzer all along. Such feature appears useful in a co-pending patent, where the MR-TOF MS is used as an ion separator of a tandem MS and the bypass feature would allow toggling between tandem and MS-only regimes.

The steering could be used to pass ion packets along a repetitive, cyclic folded ion path, wherein an increase of flight path is accompanied by a proportional shrinking of mass range, a compromise to be made upon requirements of a particular application. In this case the steering device 32 can be used also as an ion gate for choosing a desired part of the analyzed mass spectrum Geometrical constrains of the entire analyzer and a fringing field of mirror edges may become important while using reflections in the drift direction. An optional way around the problem is in passing the ion beam through ion mirrors, more specifically, through the slit in the mirror cap electrode 15C. The mirror 15 then can be extended by adding separate electrodes, e.g. as shown by dashed line, and should be turned on and off in a pulsed mode.

A particular example 41 of steering device is shown also on the FIG. 6. The steering device 41 comprises a set of parallel plates 42 to 46, where plates 42 are grounded. The device combines feature of planar deflecting plates and of a planar lens. The device could be either toggled between two functions or could combine two functions simultaneously by tuning voltages on plates 44 and 45. The device allows incorporation into a periodic structure of lenses. In this case, each individual cell could be used for both ion focusing and/or reflection in a drift direction. Deflection plates could operate constantly or in a pulsed mode to allow ion gating, selecting narrow mass range, and analyzing multiple precursors or multiple mass windows simultaneously. Flexible switching between lenses and deflectors is also useful while overcoming the problem of fringing fields, since the deflectors can create a closed loop ion trajectory, staying well within boundaries of the unaffected mirror field (not shown).

Introduction of ion deflection causes compromises in time-of-flight resolution; hence they are generally used for ion manipulation, extension of flight time, rather than for improving resolution of the MR-TOF MS.

For example, with a typical energy spread of 5% and the phase space of the beam of 10π mm mrad in both directions normal to the beam path, an ion optical simulations of the MR TOF MS of the invention with L=25 mm predict the achievable mass resolving power (FWHM) of 100,000 without using deflectors in the mode with the maximal focal length of the lenses, equal to the length of the full beam turn (two reflections). With the tightest focusing induced by lenses and additional use of deflectors, this resolving power is expected to drop down to 30,000. Note however that because of the extended flight time this value can be achieved for much more relaxed values of the ion turn around time as compared to the conventional TOF MS with the same resolving power.

Now that we have completed a description of the MR-TOF MS of the invention it is of particular importance to note, that the novel MR-TOF analyzer has a much higher tolerance to spatial and temporal spreads of ion beam. The novel analyzer provides a stable ion beam confinement, which allows an extension of flight time without causing geometrical ion losses. An extended flight time, in turn, enhances TOF resolution and reduces the effect of ion turn around time, appearing in the pulsed ion source. Finally, the MR-TOF MS of the invention also provides a high order time-of-flight focusing with respect to the spatial spread of initial ion beam, i.e. much wider beams can be accepted without loosing time-of-flight resolution. On the other hand, an extension of flight time reduces efficiency of ion sampling out of continuous ion beams. Though the invention may be used with a pulsed ion sources like secondary ionization mass spectrometry ion source (SIMS) or matrix assisted laser desorption (MALDI), a long-term stability of excited ions may become an obstacle. Stability of those ions may be improved by gas dampening from a pulsed gas supply. Even with a pulsed acceleration of such ions the duration of ion pulse becomes to large to consider those sources as pulsed. The contradiction is resolved with the introduction of another key feature of the invention—incorporation of ion storing and pulse ejection into a continuous or quasi-continuous ion sources, like electrospray (ESI), atmospheric pressure chemical ionization (APCI), electron impact (EI), chemical ionization (CI), photo ionization (PI), inductively coupled plasma (ICP), a gas filled MALDI, as well as ion gaseous reaction cells or a collisional cell of any tandem mass-spectrometer.

The invention strongly improves efficiency of ion sampling into an MR-TOF MS by adding an ion storing step for accumulation of continuous ion beam and pulsed ion ejection at a reduced frequency, corresponding to an extended flight time of the MR-TOF MS. Such ion storing occurs in gas filled radio frequency (RF) storage devices of various kinds, including ion guides, RF channels, IT or LIT, wire or ring electrode traps, incorporated either into an ion source itself or into an accelerator of the MR-TOF MS. The storage devices of the art are gas filled for ion dampening at gas pressure sufficient for hundreds of ion collisions with gas molecules. Those devices employ radio frequency (RF) field for ion radial confinement and axial static or moving wave electric fields for controlling axial ion motion. The storing step avoids ion losses between rare pulses of any MR-TOF MS.

In reference to FIG. 7A, and using a block diagram level of detailing, the pulsed ion source in the—MR-TOF MS of the preferred embodiment of the invention 51 comprises a continuous ion source 61, a storing ion guide 71, a second storage device 81, an accelerator 91, being sequentially interconnected. The pulsed ion source 51 is connected to the MR-TOF 31. The block diagram shows the most general case, wherein elements 71, 81 and 91 are optional, i.e. could be either omitted or merged together within some particular embodiments.

In operation, the continuous ion source 61, preferably gaseous ion source, generates a continuous ion beam, which is preferably transported within an ion guide 71. Preferably, the ion guide 71 stores continuous ion beam and ejects ion packets periodically with a period corresponding to that of the MR-TOF analyzer 31. Such ejected ion packets are passed into the accelerator 91, either directly or via an optional, second storage device 81. The accelerator, continuous or pulsed, inject fast ion packets into the MR-TOF analyzer, axially or orthogonal. Both, the ion guide 71 and the second storage device 81 could be any RF confining and gas filled device as illustrated by the following list: 3-D ion trap, quadrupole, multipole or wire ion guide, RF channel, ring electrode trap, ion funnel or a linear ion trap.

The major function of an additional storing device 81 is to prepare an ion cloud at different conditions compared to the rest of ions, stored in the first storing ion guide 71. Such conditions may differ by gas pressure, space charge or mass composition of ion beam or by configuration of ejecting electrodes. As it will be shown in the following description, the dual storage scheme is more flexible, allows full utilization of ion beam and a number of automatic adjustments. Most important, it generates ion beam with a smaller phase space and improves beam acceptance by analyzer. The advantages of using an additional storage device will become apparent in the following detailed description of the preferred embodiment of the MR-TOF MS of the invention, which employs the dual storage scheme.

FIG. 7B shows the particular example 61B of gaseous continuous ion source—ESI ion source, comprising a spraying probe 62, a sampling nozzle 63, a sampling skimmer 64 and pumps 65 and 75. Components and principles of operation of ESI ion sources are well described in the art. A solution of analyte compound is sprayed from the probe 62 in the region with atmospheric pressure. Highly charged aerosol evaporates, thus forming gaseous ions of analyte, which are sampled via the sampling nozzle 63. The pump 65 evacuates an excessive gas to a gas pressure of few mbar.

Ions are further sampled via the sampling skimmer 64 with assistance of gas flow and electrostatic fields, generating a continuous ion beam 66, while gas is evacuated by the pump 75.

FIG. 7C shows the particular example 61C of a quasi-continuous, MALDI ion source with gas cooling, which comprises a sample plate 67, a laser 68, a supply 69 of cooling gas and a pump 75. The MALDI ion source 61B with gas cooling generates ions of analyte, while illuminating a sample on a sample plate 67 by the pulsed laser 68. A supply 69 provides a cooling gas around the sample plate at an intermediate gas pressure, about 0.01 mbar (WO9938185) or around 1 mbar (WO0178106). Ions, emitted from the sample plate are cooled and stabilized in gas collisions. Ion stability is particularly important for the use in MR-TOF MS, since it employs a prolonged analysis time. Ions kinetic energy and sharp timing characteristics become dampened in gas collisions. The resulting ion beam 66 is considered more as a quasi-continuous ion beam, rather than a pulsed ion beam.

FIG. 7D shows a schematic of an intermediate storing ion guide 71. Both of earlier described ion sources 61B and 61C are connected to an ion guide 71. The particular example 71 of the storing ion guide comprises quadrupole rods 72, supplied with radio frequency (RF) voltage, a set of supplementary electrodes 73, an exit aperture 74 and a pump 75. Note, that the same pump 75 has been shown earlier in FIG. 7B and 7C. In operation, either continuous or quasi-continuous ion beam 66 is directed into the ion guide 71. Ions are sampled via an aperture 64, while the pump 75 evacuates an excessive gas. The aperture 64 and the pump 75 are similar in cases of both ion sources, because of about equal gas pressure in front of the aperture 64. Ions are accumulated between RF rods 72, while being dampened in gas collisions and being retarded by apertures 64 and 74. Ions are confined near the axis of RF quadrupole and in the bottom of DC potential well. Periodically ion packets 76 are pulse ejected out of the storing ion guide and into the accelerator 91, either directly or via an optional, second ion storage device 81, described below.

The invention may employ an unusual arrangement of ion storing, where supplementary electrodes 73 organize axial DC distribution in the ion guide 71. The electrodes 73 surround the RF rods 72, such that their electrostatic field efficiently penetrates between the rods. The axial DC distribution is adjusted and varied in time to provide spatially distributed ion storage, a controlled ion sampling and a moderate duration of ion ejection process. Note, that manipulations by voltages on the supplementary electrodes 73 do not require any manipulation by RF potentials on RF rods 72. In fact, it is advantageous to keep RF voltage applied to the rods 72 in a steady state, thus providing a better focused pulsed ion packets. Since ions are ejected along the axis, where the RF field is negligible, the RF field has very little affect on axial ion velocity. Applying separate RF and pulse signals to different sets of electrodes provides an obvious convenience and ease of making electronics supplies.

The storing ion guide 71 can be coupled directly to the accelerator 91, preferably orthogonal. Since the ion guide is filled with gas it is preferable to provide a soft ion ejection by small modulation of potentials on electrodes 73 and 74. Such slow (few to few tenths of electron Volts) and fairly long (several microseconds) ion packets are well compatible with synchronized orthogonal acceleration. The scheme is not shown since it is fairly common in the prior art (e.g. U.S. Pat. No. 6,020,586). The packet 76 passes via an additional differential pumping stage to accommodate the gas filled ion guide to the analyzer at deep vacuum. The additional stage comprises a lens, forming a nearly parallel ion beam. The ion packet enters an orthogonal accelerator 91, synchronously injecting ions into the analyzer. It is preferable using a gridless accelerator made of flat plates with slits elongated along direction of slow ion beam. An obviously attractive scheme of orienting slits along the shift direction of MR-TOF in fact is inferior to the orthogonal arrangement, wherein the source and slits are oriented and elongated orthogonal to the plane of the folded ion path. Apparently ion focusing by ion mirrors has a higher (second) order time of-flight focusing with respect to spatial spread compared to periodic lens having first order focusing if used with a proper compensation by tuning ion mirrors.

The orthogonal accelerator could be either positioned in the drift space of the MR-TOF analyzer of the invention, or combined with one of the mirrors (or a pulsed portion of one ion mirror) of the planar MR-TOF analyzer of the invention and operated in a pulse manner. Similarly to the prior art, the storage ion guide provides an advantage of saving duty cycle of the orthogonal acceleration at the expense of ion mass range.

Figure 8:
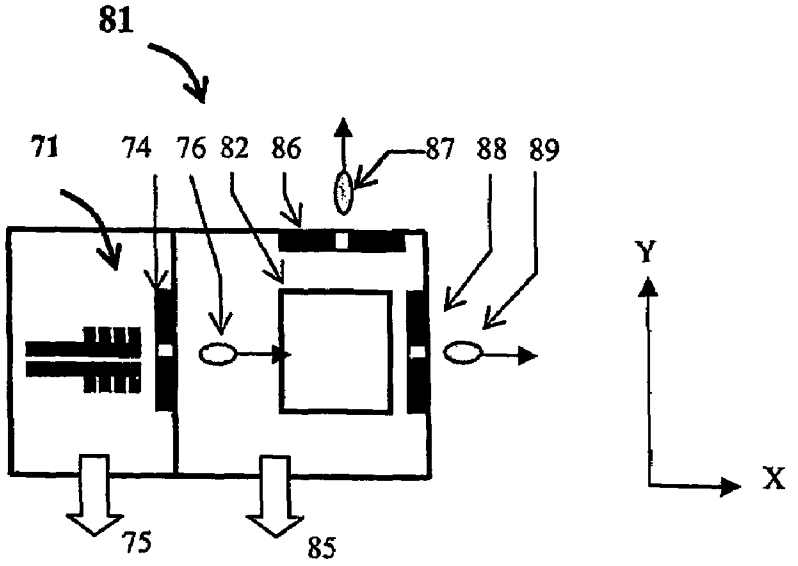

FIG. 8 shows block diagram of the second storage device 81. The second storage device 81 comprises a generic ion trap 82, an exit aperture, either axial 88 or orthogonal 86 and a pump 85. The storage device 81 is connected the ion guide 71, preferably a storage ion guide. In operation, ions are continuously or pulsed injected from the ion guide 71 into the generic trap 82. The generic ion trap may be a 3-D ion trap, a linear ion trap formed in quadrupole, a multipole or wire ion guide, preferably equipped with supplementary DC electrodes, RF channel, ring electrode trap, ion funnel or a combination of those devices. The trap is preferably maintained at a reduced gas pressure about 0.1 mTorr with gas being evacuated by the pump 85. Because of the combined action of RF and DC fields and of the gas dampening, ions are confined near the exit of the trap. Ions are periodically ejected out of the storage device 82 directly into the MR-TOF analyzer, either axially 87 or orthogonally 89, via a corresponding aperture, either 86 or 88, serving to reduce gas load onto pumping system of MR-TOF analyzer.

FIG. 9 shows block diagram of dual ion storage with axial ejection and with an optional accelerator. An optional accelerator 91 comprises a set of electrodes 92, located in the housing 97, which is evacuated by a pump 95. In a particular example of FIG. 9 accelerator shares housing and pump with MR-TOF, though they may be pumped differentially to enhance vacuum in MR-TOF. The pulsed ion beam 89 comes out of second storage device 81 and is accelerated within a set of electrodes 92. There are numerous types of accelerators described in the art. As an example, such electrodes may be made of wires, or made of rings or plates with slits or with meshes. They also may comprise electrodes supplied by RF signal to confine ion beam. Ion are accelerated either axially 94 or orthogonally 93 to the direction of ion injection. The accelerator operates either continuously or in a pulsed mode synchronized with ion injection. In all cases the accelerator may be arranged and controlled such that the ion package will experience a local compression 96 at some intermediate time-focusing plane, called an object plane.

FIG. 10 shows a particular arrangement 101 of a second storage device 81 with a pulsed axial ion ejection. The particular second storage device 81 comprises a set of multipole rods 102 with short rod extensions 103 and an exit aperture 104. The storage device 81 further communicates with an axial DC accelerator 91, which comprises DC accelerating electrodes 105 and an aperture 106.

In operation, ions are formed in an ion source and preferably come via an intermediate ion guide 71 either as continuous ion source or as a slow ion packet. The second storage device 81 is held at relatively low gas pressure, say 0.1-1 mTorr, still sufficient for ion corisional dampening during 1 ms storage time. Rod extensions 103 are supplied with the same RF signal as rods 102, but kept at a slightly lower DC (10-50V lower compared to rods 102). Ions are periodically stored and pulse ejected out of the second storage device 81 by varying potential on the exit aperture 104. At ion storage stage, the aperture 104 is kept at a retarding potential thus forming a local DC well in the vicinity of exit aperture 103, while still confining ions in radial direction by RF field of rod extensions. The sharpness of DC well is adjusted such that ion cloud sizes about 0.5 to 1 mm. At ion ejection stage, the aperture 104 is drawn to a strongly negative potential (for positive ions), extracting ions along the axis and out of the second storage device 81. Note that RF field stays on. Since ions are confined near the axis, they experience very little effect of RF field during axial ejection. The DC accelerating electrodes 105 may serve as an energy corrector and a lens for simultaneous spatial focusing of ion packets 107. An exit aperture 106 may be used to reduce gas load on MR TOF MS pumping system. Our estimates suggest that unless ion cloud would create space charge potential above 0.5V, parameters of ion packets 107 are well suitable for MR-TOF MS. At 0.2 eV energy spread, ion cloud diameter 0.5 mm, acceleration potential of 5 kV and 500 V/mm extraction field the ion beam parameters are: divergence is below 1 degree, energy spread is below 5% and turn around time of 1 kDa ions is below 8 ns.

FIG. 11 shows arrangement 111 providing orthogonal ion acceleration out of a non-storing ion guide. The arrangement comprises an ion trap 108, a non-storing ion guide 109 and DC accelerator 91. The arrangement 111 could be implemented with various types of ion traps and ion guides. The particular ion trap 108 of FIG. 11 is formed by an RF multipole set 112, surrounded by DC electrodes 113 and an exit aperture 114. A particular non-storing ion guide 109 comprises a multipole set 115 with a slit 117 in one of electrodes or an opening between electrodes of RF multipole. The multipole 115 is optionally surrounded by supplementary DC electrodes 116. Both stages of ion trap and ion guide are pumped with pumps 85 and 95.

In operation, ions are formed in an ion source and preferably come via an intermediate ion guide 71 either continuously or as a slow ion packet. The ion trap 108 is held at a relatively low gas pressure, say 0.1-1 mTorr, still sufficient for ion collisional dampening during 1 ms storage time. Ions are periodically stored and pulse ejected out of the ion trap 108 as a slow ion packet (1-10 us) by modulating potentials of DC electrodes 113 and of exit aperture 114. The multipole 115 of the ion guide 109 is supplied with RF signal to continue radial ion confinement of axially propagating ion packet. With some predetermined delay to ion injection pulse a second extraction pulse is applied to multipole rods 115 as well as optional pulse may be applied to the supplementary electrodes 116. Potentials on multipole 115 are zeroed at a predetermined phase of RF signal (say, at zero volts) and then (after a short 10-300 ns 'switch' delay) switched to some predetermined pulsed potentials to provide ion bunching and ion extraction in-between multipole rods or through a slot 117 in one of the rods. Ions then undergo acceleration in the DC stage 91 and enter the MR-TOF MS 31. The delay between first pulse ejecting ions out of the ion trap 108 and the second extraction pulses in the ion guide 109 is adjusted, such that to maximize mass range of orthogonally extracted ions.

It should be noted that the storage 103 and accelerator 104 could be confined in a single unit, with gas extending for the entire length of rods 112 and 115, whereas aperture 114 and electrodes 113 could be omitted altogether and electrodes 112 and 115 could be optionally combined into a single set of electrodes.

FIG. 12 shows yet another particular arrangement of the storage device, which may be called 'a hybrid of ion guide with 3D ion trap'. Referring to FIG. 12, the particular storage device 121 comprises a quadrupole ion guide formed of two pairs of electrodes 122 and 123, and a 3-D Paul trap with a ring electrode 127 and cap electrodes 126 and 129. The ring electrode 127 is open with a large size aperture 125. The cap electrode 129 has an aperture 130 for orthogonal ion ejection.

In operation, a continuous radio frequency (RF) field spans across the ion guide and the 3-D trap. In a simplest mode, pair of electrodes 122 is connected to ring electrode 127 and form one pole, which is supplied with RF voltage, while pair of electrodes 123 is connected to cap electrodes 126 and 129, forming another pole. The same RF field may be achieved if RF voltage is supplied symmetrically between the above two poles. In a preferred mode, similar structure of RF field is preserved. However, corresponding electrodes may be supplied with signal of the same frequency and phase, while having different amplitude of RF voltage and separately controlled DC potentials. Ions are supplied (continuously or pulsed) through the ion guide between pairs of electrodes 122 and 123 and enter into the 3-D trap via an opening 125.

Distribution of RF and DC potentials form a mass dependent axial barrier between linear quadrupole 122-123 and quadrupole trap 126-129 with amplitude in the range of several volts, and inverse proportion to ion mass-to-charge ratio m/z. In general case, the barrier causes ion sharing between the guide and the 3-D trap. By raising DC offset on electrodes 122-123 and with assistance of gas collisions, majority of ions could be concentrated in the middle of 3-D trap. In a preferred mode the said DC offset is slowly ramped up such that the barrier disappears for ions above some m/z*. Ions of m/z* pass over the barrier with a minimum amplitude of secular oscillations in the trap. Slow DC ramping allows soft transfer of all ions into the trap. At the same time, ions coming from the ion source could be stored in the intermediate storing ion guide 71 to improve duty cycle. After ions are dampened in 3-D trap (1-5 ms), RF field could be switched off and after a short and optimized delay (10-300 ns), a high voltage pulse is supplied to at least some of 3-D trap electrodes 126, 127 and 129, such that to eject ion packet via the aperture 130 in the cap electrode 129. In one preferred mode, the RF voltage is replaced by a square wave signal and the ion ejection pulse is synchronized to a specific phase of the square wave signal, such that potential distribution stays constant during the ion ejection phase.

FIG. 13 shows a segmented analog 131 of the above described hybrid trap 121. The pair of quadrupole rods 122 is replaced by a plate 132 with a channel 135. The ring electrode 127 is replaced by a plate electrode 137 with a circular hole 138. The pair of electrodes 123 is replaced by plates 133 and 134, symmetrically surrounding plate 132. The cap electrode 126 is replaced by a cap plate 136 and cap electrode 129 with aperture 130 is replaced by a cap plate 139 with an aperture 140. Cap plates 136 and 139 are located parallel to plates 133 and 134 or as their extension. The plates are arranged as a sandwich shown on the left part of FIG. 13. The same electrodes are shown separately on the right part of FIG. 13.

In operation, the segmented trap 131 provides the same field structure in the vicinity of axis. It is a quadrupolar 2-D field near the axis of the channel 135 and a 3-D quadrupolar field near the center of circular hole 138. Trapping field is formed by either RF voltage or square wave signal applied to plates. RF field provides ion sharing between segmented ion guide and segmented 3-D ion trap. Periodically RF signal is switched off at some fixed phase of RF signal (preferably 0V) and after a predetermined delay (10-300 ns) a high voltage pulse is applied to electrodes to provide for ion ejection within nearly homogeneous electric field. Ion packet is extracted via an aperture 140, also serving to reduce gas load onto pumping system of MRTOF. Preferably an RF signal is applied only to central plates 135 and 137, a DC ramp is applied to plates 133 and 134 (or including 132) and high voltage pulses are applied to plates 136 and 140. Such arrangement allows separating RF, DC signals and high voltage pulses.

Other embodiments of ion storage 91 may include a linear ion trap formed by coaxial apertures (see e.g. A. Luca, S. Schlemmer, I. Cermak, D. Gerlich, Rev. Sci. Instrum., 72 (2001), 2900-2908), segmented trap with orthogonal ejection (similar to that in U.S. Pat. No. 6,670,606B1), segmented ring ion trap (Q. Ji, M. Davenport, C. Enke, J. Holland, J. American Soc. Mass Spectrom, 7, 1996, 1009-1017), wire traps, traps, formed by meshes surrounded by electrodes with RF signal, helical wire traps, etc.

FIG. 14 shows the detailed schematics of the preferred embodiment of MR-TOF MS of the invention. The preferred embodiment 141 of the invention comprises a multi-reflecting analyzer 31 and a pulsed ion source 51. As been earlier described the pulsed ion source 51 comprises sequentially connected continuous ion source 61, an intermediate storing ion guide 71, a second storing ion guide 81 and an accelerator. Each main component comprises earlier described elements. The particular shown example of continuous ion source 61 is an ESI ion source, comprising a spray probe 62, a sampling nozzle 63, a sampling skimmer 64 and a pump 65. The intermediate storing ion guide 71 comprises a set of quadrupole RF rods 72, surrounded by supplementary pulsed electrodes 73, an exit aperture 74 and a pump 75. The second storing ion guide 81 comprises a gas confining cap 82, a set 83 of quadrupole RF rods, surrounded by a set 84 of supplementary pulsed electrodes, an exit aperture 88, a pump 85. The accelerator 91 comprises a set of electrodes 92, a housing 97, shared with the MR-TOF MS analyzer and a pump 95. The MR-TOF analyzer 31 comprises a field free region 14, two planar and gridless ion mirrors 15, an in-line ion detector 34, a set of periodic lenses 17, a set 32 of entrance steering plates, and a set 33 of exit steering plates.

In operation, the ESI ion source 61 generates the continuous ion beam 66, which is stored in the storing ion guide 71 at an intermediate gas pressure (from 0.01 to 0.1 mbar). The intermediate storing ion guide 71 periodically ejects slow ion packets into the second storing ion guide 81, which operates at a lower gas pressure (preferably from 10-4 to 10-3 mbar). A gas confining cap 82 allows having a higher gas pressure in the upstream area of the second ion guide 81, thus improving ion dampening and ion trapping at a smaller gas pressure near the exit of the guide. This helps reducing gas load onto a pump 95 and, thus, helps keeping low gas pressure in the chamber 97 of MR-TOF analyzer 31 and accelerator 91, MR-TOF normally requires a lower gas pressure (below 10-7 mbar) because of the extended flight path, compared to conventional TOF MS.

The slow ion packet contains a fixed portion of all ions accumulated in the first ion guide 71. As a guiding example, approximately 10% of stored ions are sampled through the aperture 74 in about every 1 ms. Such balance between coming and leaving ions allows refreshing of the ion content in every 10 ms. The amount of ions, stored in the first ion guide 71, depends on intensity of ESI in beam. At a typical ion flow of 3.108 ions a second the first ion guide 71 would contain about 3.106 ions, known to build up a noticeable space charge field. With only 10% of ions being sampled into the second storage the amount of ions in the second storage is about 3.105. Such ion cloud, being stored in 1 mm3 volume would create about 30 meV potential of space charge, being close to thermal energy (gas kinetic energy of 25 meV) and moderately affecting ion initial parameters. The dual storage scheme provides several advantages. First, pulsed injection into the second storing quadrupole ensures a complete ion dampening at low gas pressure. Second, the amplitude of RF signal in the first quadrupole may be adjusted to operate as a low mass filter. By removing most of solvent ions and chemical background ions the space charge is further reduced. Third, by using selective excitation of secular ion motion one can also achieve a selective removal of the most intense ion species, building up space charge and saturating the detector. Besides, by adjusting the duration of ion injection one can control intensity of ion beam. It helps improving dynamic range of data acquisition and in avoiding saturation of the detector.

The first ion guide 71 ejects slow ion packets by a very gentle pulsed axial field, generated with assistance of pulse potentials on the exit aperture 74 and optionally on the additional electrodes 73. The use of the set 73 of additional electrodes allows an accurate control of energy and amount of ejected ions within the packet. The ejected ion packet is almost completely trapped in the second storing ion guide 81, using a pulsed trapping scheme. In more details, a potential on exit aperture 88 forms a repelling DC barrier, while RF field of electrodes 83 confines ions in radial direction. Ion packet gets reflected from the far end 88, however, by the time ions will return to the entrance (74) of the second guide 81, they will see a repelling potential of electrode 74, which was raised after the completion of ion ejection from the first ion guide 71. Ion kinetic dampening is accelerated because of a higher gas pressure in the beginning of the ion guide 83. The local increase of gas pressure is formed by gas confining cap 82 and by a gas jet, emerging from the aperture 74.

Trapped ions get confined in the DC potential well, formed with the aid of additional electrodes 84. Such electrodes surround RF rods 83 of the second ion guide 81, such that to make an effective and symmetric penetration of potentials of the additional electrodes. Referring to the electrostatic field on the axis of the ion guide 81, a set of additional electrodes 84 forms an axial distribution of DC field while generating a moderate octapole DC field in the radial direction. It is important to keep such octapole DC field small enough to avoid ion instability during a long term storage. As a numeric example, an RF potential of 1.5 kV and 3 Mhz frequency is applied to 5 mm quadrupole rods positioned on 10 mm diameter between centers, Each additional electrode is formed as a plate having central hole of 5 mm and 7 mm holes for rods. About 20% of potential of such plate penetrates to the center of quadrupole assembly. Three plates are located 3 mm apart from each other and 5 mm away from the exit aperture. By applying 10V drop to the central plate we form a DC well of c.a. 2V deep. Ions with energy of 100 meV are confined into cloud of c.a. 1 mm long and fraction of mm in diameter. The arrangement has very little effect on ion stability and allows storing of ions within at least one decade of mass to charge ratio.

After collisional dampening and confinement in the ion guide 81 the ion packet get axially ejected (in the X direction) into the DC accelerator 92 and then into the MR-TOF analyzer 31. After emptying of second storage the pulsed potentials are returned to their trapping state to prepare for the next cycle of ion storage. The pulsed ejection is made with the aid of high voltage electric pulses, applied to the set 84 of additional electrodes and to the exit aperture 88, while keeping RF potentials unchanged. Low gas pressure in the second storing quadrupole 81 helps avoiding gas discharges while applying high voltage pulses. Since all the ions are stored in the small volume, such pulses do not spill any other ions and pulse amplitude could be fairly high—enough to noticeably reduce ion turn around time. Thus, the ability of compressing ion packet into a small cloud and the ability of applying high voltage accelerating pulses are, in fact, another two important reasons for dual storage arrangement. Such ion packet parameters could not be achieved in case of fast ejecting directly out of the first ion guide 71.

Application of fairly large ejecting pulses causes a substantial reduction of ion turn around time and thus allows using an ion guide directly as a pulsed ion source for MR-TOF MS. In our ion optics simulations, made for the above geometrical example, we found that by applying high voltage pulses to the additional electrodes the turn around time could be reduced to few nanoseconds. For example, by applying 5 kV pulse to the middle additional electrode (out of three) and −1 kV pulse to exit aperture, an axial field reaches c.a. 200 V/mm. Assuming 200 meV initial energy spread and 1 mm size of stored ion cloud, the turn around time of 1000 amu ions is 10 ns only and the energy spread of ejected ion packets is below 200 eV. By applying a c.a. 4 kV DC post—acceleration in the DC accelerator 92 the ion beam has less than 5% energy spread, is well focused and has a phase space below 10π*mm*mrad, which is well compatible with the wide acceptance and high order time-of-flight focusing of the MR-TOF analyzer of the invention.

In ion optics simulations by inventors the resolution of the MR-TOF MS appears to be mostly limited by turn around time. As a numerical example, ions of 1000 amu, accelerated to 4 keV energy and Velocity 3×104 m/s have 10 ns turn around time, while having 1 ms flight time in 0.25 m wide analyzer with 50 reflections (25 reflections while shifting in one direction and 25 reflections on the way back). Such analyzer provides a folded path with the effective flight path of 30 m. If 10 ns turn around time is indeed the only limiting factor, then resolution reaches R=50,000. Further extension of flight time is expected to improve resolution even more. A longer accumulation would cause some deterioration of the turn around time. However, the increase of space charge field and of the turn around time is expected to be slower than the increase of flight time.

Increasing storage time stresses the dynamic range of the detector. With an increased time-of-flight in MR-TOF and more efficient ion utilization, ions from up to 1 ms accumulation arrive to detector in short packets of 10-20 ns duration. To avoid saturation of detector and therefore loss of analytical parameters (such as mass accuracy, mass resolution, dynamic range, etc.), one may enhance dynamic range of detector by using a secondary electron multiplier (SEM) combined with analog-to-digital converter (ADC), rather than micro-channel plate detector (MCP) combined with time-to-digital converter (TDC). As one of embodiments, a hybrid detector could be employed, wherein a single micro-channel or micro-sphere plate is followed by a scintillator and photomultiplier. It is also proposed to use any combination of the following measures:

a) using SEM with two collectors sampling electrons at different stages of amplification or b) using an arrangement with dual SEM combined with a rapid steering device and/or c) using dual amplifiers connected to a pair of acquisition channels and/or d) alternating between two different storage time in the intermediate or second storing trap, such that intensity of ion pulses varies between shots.

Note that MR-TOF is expected to have longer ion pulses (10-20 ns), compared to conventional TOF (1-3 ns). Lower bandwidth requirements make it easier to implement the means mentioned above.

Higher efficiency of ion usage in MR-TOF would cause faster aging of the detector. In order to increase life time of the detector and to enhance its dynamic range it is also proposed to use a pre-scan of mass spectrum at lowered storage times. From this pre-scan, a list of exceedingly intense peaks could be deduced and stored in the memory of instrument controller. This list could be used to control a pulsed ion selector. Pulsed ion selector could be incorporated in the detector or any of the deflectors or lenses or in the drift space of MR-TOF in any of the above embodiments. This selector is used to suppress ions with mass-to-charge ratio corresponding to intense ion peaks by deflecting or scattering a substantial portion of intense packets while they fly through the selector. It is also possible to divert these peaks to another detector with a substantially lower gain. Preferred embodiments of the selector include: Bradbury-Nielsen ion gate, parallel-plate deflector, a control grid within the ion detector (e.g. a grid between dynodes or microchannel plates pulsed to stop passage of secondary electrons through it). Suppression of ion intensity may be considered in calculation of actual ion intensity. The number of ions per shot may be then suppressed at any stage of ion storage or at MR-TOF or at the detector.

In addition to stressing and aging the detector an excessive amount of ions per pulse (above 2*105) is responsible for build up of space charge in storage devices. Various strategies may include a controlled suppression of ion beam intensity or a number of ions per pulse at stages of preliminary or secondary ion storage. Such controlled suppression may include selection of mass range of interest, removal of low mass ions, mass selective removal of the most intense ion components, for example by exciting their secular motion in RF trapping device and causing selective loss of those ions.

The above-described scheme of MR-TOF MS combined with ion trap source allows 100% conversion of continuous ion beam into ion packets. Besides, achievable parameters of ion packets allow a complete transmission of ions through the novel MR-TOF MS and if turn around time is the major limiting factor then it still allows reaching a 50,000 resolution within a 1 m long instrument. Those parameters exceed resolution and sensitivity of existing o-TOF MS as well as superior to that of the existing MR-TOF MS Stable ion confinement in the multi-reflecting analyzer and within a set of periodic lenses improves sensitivity and resolution of MR-TOF and allows a prolonged ion separation. Those properties of novel analyzer could be very useful in tandem mass spectrometer with parallel MS-MS analysis, described in a co-pending application WO2004008481 of one of the authors and incorporated here by the reference. Here we introduce a set of periodic lenses into a first multiple reflecting analyzer of TOF-TOF tandem, thus improving both sensitivity and resolution of parallel MS-MS analysis.

Referring to FIG. 15, a preferred embodiment of tandem mass spectrometer 151 comprises a pulsed ion source 51, a multi-reflecting mass spectrometer 31, a fragmentation cell 152 and an orthogonal time-of-flight mass spectrometer 161. The above described pulsed ion source 51 comprises a continuous ion source, a dual storing ion guide and an accelerator. The second storing ion guide is shown here as an RF linear ion trap 83 with auxiliary DC electrodes 84, set up for axial ion ejection. The above described MR-TOF MS 31 comprises a field-free region 14, an off-line detector 34, two of planar gridless mirrors 15, preferably containing more than four electrodes, configured and controlled to provide high order time-flight and spatial focusing, a set of periodic lenses 17 for stable ion confinement along the folded ion path and a pair of edge deflectors 32 and 33, preferably incorporated into edge elements of periodic lenses 17 and providing extension of flight path by edge ion reflections.

The fragmentation cell 152 is a fast fragmentation cell, described in details in a co-pending patent application. Preferably the fragmentation cell comprises a short (5-30 mm) RF quadrupole 158 for radial ion confinement, as well as auxiliary DC electrodes 159 and an exit aperture 160 to form a time dependent axial electric field. The quadrupole is surrounded by an inner cell 156, filled with gas at a relatively high gas pressure (0.1-1 Torr) via port 157. To reduce gas load on MR-TOF the space around the cell 156 is pumped by turbo pump 155. To enhance ion transmission the inner cell is supplied with focusing lenses 154 on both ends.

The orthogonal TOF 161 is a conventional device, well described in the art. It comprises an orthogonal acceleration stage 163 with a pulsing electrode 162 and an in-line detector 164, a pump 165, an electrically floated field free region 166, an ion mirror 167 and a TOF ion detector 168. The orthogonal acceleration is preferably made of flat electrodes with slits oriented along the entering ion beam. The orthogonal TOF differs from most conventional instruments by a shorter ion path (0.3-0.5 m) and a higher acceleration voltage (above 5 kv) to provide for a fast fragment analysis at about 10 us time. In operation, pulsed ion source 51 periodically (say, once per 10 ms) generates bursts of parent ions, converting continuous ion flux from ion source 61 into ion pulses by storing and ejecting ions out of the second storage device 82. The mixture of parent ions having different m/z ratios represents a mixture of different analyzed species. Ions are separated in time in the first analyzer 31 with an extended multiple folded ion path, exceeding 30 m. The analyzer operates at reduced ion energy about 50 to 100 eV to extend separation time to about 10 ms. The MR-TOF of the present invention is very well suited for ion separation at reduced energies and prolonged flight times. The analyzer tolerates high relative energy spread (up to 20%) by providing a high order time-of-flight focusing with respect to ion energy. It also provides an exceptional transmission at reduced ion energies. Ions are bounced in X direction and periodically focused in Z direction by ion mirrors. Simultaneously ions are retained along the jig-saw folded trajectory because of periodic focusing in a set of periodic lenses 17, thus providing periodic focusing in X direction. The ion flight path is extended by reflections in the edge deflector 33. Initially injected ions follow path 35. After steering in the edge deflector 32, ions follow trajectory 36 and experience multiple bounces between mirrors. The trajectory 36 approaches the second edge deflector 33 from the right. The edge deflector 33 steers ions such that they follow trajectory 37. Such steering reverts the direction of ion drift along Y-axis. The trajectory 37 again passes through multiple lenses and approaches to the edge deflector 32 from the left. The static edge deflector 32 steers the beam into the fragmentation cell 152. Note, that ion edge reflection is made using constant voltages. The flight path is doubled while retaining full mass range of the analyzer.

The deflectors could be used in a pulsed mode for several purposes:

1. To further extend flight path at the expense of the mass range. By pulse adjusting deflector 32 to a double deflecting voltage the trajectory becomes enclosed. Ion coming along trajectory 37 will be returned back into trajectory 36 and will experience multiple edge deflections until deflector 32 is switched back to a smaller deflection and ions are released along the trajectory 39 or trajectory 38 in case deflector 32 is switched off
2. To divert ions onto the off-line detector 34 after a single edge deflection. The deflector 32 is switched off after heaviest ions of trajectory 35 pass through the deflector into MR-TOF and before lightest ions of trajectory 37 approach the deflector 32.
3. To bypass analyzer by steering the beam into the off-line detector 34
4. To make a crude mass separation or suppression of unwanted species, like low mass or very intense ions.

Parent ions are introduced into fragmentation cell 152 at a kinetic energy (about 50 to 100 eV) sufficiently high for ion decomposition. As described in a co-pending invention the fragmentation cell is filled with gas, preferably at an elevated gas pressure above 0.1 Torr and the cell is kept short (about 1 cm). A higher (than usual 0.005 to 0.01 Torr) gas pressure in the cell requires an additional envelope of differential pumping with additional means of ion focusing either electrostatic lenses or an RF focusing devices. Ion transfer through the cell is accelerated by axial DC field or a moving-wave axial field. As a result ions pass the cell in about 20 us time, while spreading ion packet by less than 10 us. The same field allows periodic storing and pulse ejection of ions, or at least a substantial synchronous modulation of ion velocities.

Fragment ions are then ejected out of the cell and into the second TOF analyzer 161 for mass analysis. To improve efficiency of the second analyzer, ions are periodically bunched at about every 10 us at the exit of fragmentation cell 152 and those pulses are synchronized with pulses of the orthogonal acceleration 163 in o-TOF 161. The second analyzer 161 is adjusted to have a short flight time (10 to 30 us), which is expected to be achieved at a moderate flight path (less than 1 m) and high ion energies (above 5 kV). Drastically different time scales of two analyzers (at least 2 orders of magnitude) allow parallel MS-MS analysis of all parent ions. Fragments of different parent species are formed at a different time and a so-called time-nested data acquisition system is used to record separate fragment mass spectra without mixing them together.

Note, that in general the fragmentation cell may incorporate any RF storing device described in the art or in the present invention. By using storing and periodic pulse ejection of the cell one may equally well employ any other type of TOF MS, as long as it has short separation time, around 10 us. For example, another MR-TOF MS may be used as a second TOF analyzer, particularly if acceleration voltage is raised higher (say 5 kV) and flight path is adjusted short by using shift ion reflection.

The described MS-MS instrument is expected to have an extremely high throughput of MS-MS analysis (up to hundreds MS-MS spectra a second), particularly valuable in combination with on-line separation techniques. Such tandems are expected to be applied for analysis of extremely complex mixtures, like combinatorial libraries in pharmaceutical studies or peptide mixtures in proteome studies. The instrument has a limited mass resolving power (resolution) of both stages of mass analysis. Assuming 1 ns time resolution of TOF2 data system and 10 ms separation time in TOF1, the product of two mass resolving powers R1*R2 is less than 2.5*106, e.g. still making a powerful analytical combination of R1=300-500 and R2-3000-5000, considering capabilities of parallel MS-MS analysis. Note, that R1>300 is sufficient for separating between groups of isotopes of parent ions and R2>3000 is sufficient for charge state determination of moderate mass ions (m/z<2000 a.m.u.).

Resolution of both stages may be improved by using a larger separation time in TOF1. Stable retaining of ion beam in TOF1 would allow a much longer separation without losses in TOF1. Vacuum better than 10-11 Torr has been achieved in FTMS, allowing extension of flight time to minutes. However, a possibility of further extension of TOF1 separation time much beyond 10 ms is somehow limited by space charge effects in the pulsing ion trap. Space charge limit and limited storage time would not allow much higher resolution in both stages. As an example, combination of R1=100,000 and R2=100,000 with a product R1*R2=1010 would require 40 seconds storage time, requiring to store about 1010 ions generated by ESI source at such period. An ion cloud of 1 mm diameter would have space charge potential about 10 kV, impossible to trap. There are numerous ways of reaching a compromise by limiting number of ions in the trap below 106, either by limiting and controlling an ion injection time into a pulsing trap or by using a prior mass separation or by selective filtering out of abundant ion species. Such ion preparation steps could be made either in the intermediate ion guide 71 or in the second storage device 81.

Higher resolution of both MS stages seems to be incompatible with parallel analysis, since it requires ion losses by either attenuation of the entire beam (by limiting of injection time), or by separation of desired species or by filtering out of abundant species. However, it looks more promising to combine rapid screening at low resolution with subsequent data mining using a very high resolution in both stages. First step allows determining masses of parent ions of interest, while second analysis step is used for high precision and confident analysis of those species.

FIG. 16, shows a preferred embodiment of a high resolution tandem time-of-flight tandem mass spectrometer 171. The tandem 171 is similar to the above described tandem TOF-TOF 151, except of using timed ion selection in the first MR-TOF and using a second multi-reflecting analyzer 31B for fragment analysis. The second MR-TOF analyzer 31B is somewhat similar to the first MR-TOF. It comprises a field-free region 14B, two of planar gridless mirrors 15B, a set of periodic lenses 17B, a detector 34B and a pair of edge deflectors 32B and 33B. The second analyzer 31B also comprises an additional lens deflector 173 incorporated into the second lens of periodic lens set 17B for the purpose of flight path adjustment. Other elements of the tandem MS 171 are similar to earlier described elements. The pulsed ion source 51 comprises a continuous ion source, a dual storing ion guide and an accelerator. The above described first MR-TOF MS 31A comprises a field-free region 14A, two of planar gridless mirrors ISA, a set of periodic lenses 17A, a pair of edge deflectors 32A and 33A, an off-line detector 34A and also a timed ion selector 172 (not used in the second MR-TOF 31B). The earlier described fast fragmentation cell 152 comprises a short (5-30 mm) RF quadrupole 158, filled with gas at a relatively high gas pressure (0.1-1 Torr) via port 157. The quadrupole is surrounded by inner cell 156 with focusing lenses 154 on both ends. The cell preferably has means 159 and 160 for slowing and accelerating of ion passage through the cell, for example, by modulating axial DC field.

In operation, ions are stored in the pulsed ion source 51 and are ejected into the first MR-TOF analyzer 31A for time-of-flight separation. Separated ions or a portion of those ions are admitted by the timed ion gate 172 into the fragmentation cell 152, where ions undergo fragmentation. Periodically fragment ions are pulsed out of the cell 152 into the second MR-TOF analyzer 31B for mass analysis. Below are described two modes of operation of the tandem—a high throughput mode of parallel MS-MS analysis and a high-resolution mode of sequential MS-MS analysis.

In the first high throughput mode, the first analyzer is operated at a reduced ion energy controlled by potential of floatable field free region 14A, adjusted to about −50 V. Separation takes about 10 ms time and all parent ions are admitted into fragmentation cell 152. The timed ion gate 172 remains off while admitting parent ions, though could be used for suppression of low mass range containing majority of solvent ions and chemical background ions. The second analyzer is adjusted to a high ion energy, controlled by potential of the field free region 14B being held at about −5 kV, i.e. ion velocities are higher by one order of magnitude compared to the first analyzer. The flight path in the second analyzer is substantially reduced by using an additional deflector 173, reverting ion drift direction. Ions experience only two reflections in ion mirrors 15B and are directed into the detector 34B. Typical flight path of fragment ions becomes approximately 0.5 m i.e. almost 2 orders of magnitude shorter compared to the first MR-TOF 31A. Time scales are different by almost 3 orders of magnitude, which allow an earlier described parallel MS-MS analysis of multiple parent ions with a time-nested data acquisition. Such analysis allows rapid allocation of parent ions having a range of desired fragments (for example, for peptides composed of amino acids it is determined by the presence of the so-called immonium ions). The information on parent ion masses could be used for accelerating of detailed MS-MS analysis in the second analysis mode with a higher resolution and higher specificity.

In the second high resolution mode, both MR-TOF analyzers are operated at an elevated energy and resolution. The energy is adjusted by applying negative high voltage potential (say −5 kV) to both field free regions 14A and 14B. At typical flight path of 30 m, flight time appears around 1 ms. As a result, the frequency of a pulsed ion source needs to be adjusted to 1 kHz. Extraction pulses in the second storage device are adjusted to provide for much higher strength of electric field, similar to those employed in a high resolution MR-TOF MS. A higher voltage (say −5 kV) pulses are applied to exit aperture 92 with corresponding positive high voltage pulses (+5 kV) being applied to auxiliary electrodes 84. Higher strength of electric field causes proportional reduction of turn around time (to 5 to 10 ns) and proportional enlargement of ion energy spread (100-200 eV), estimated in case of 0.5 mm size of ion cloud. Expected resolution of first MR-TOF analyzer is expected to be in the order of 50,000 to 100,000.

To select a single species of ions at such resolution one would need 0.3 mm spatial resolution of timed ion selector, reachable with Bradbery-Nielsen gate—a device composed of two alternated rows of wires, located in one plane. By applying a short 10-30 ns pulse between two rows a short pulse of ions is admitted through the gate, while other species are steered and would be lost at a subsequent stop. As an example, timed ion gate is located near the first lens and in the plane of intermediate time-of-flight focusing. A 1000 V pulse applied to wires steers 10 kV ions by 3 degrees (1/20), which is sufficient to miss 1 mm entrance aperture 153 of the CID cell. The resolution of parent ion selection may be further improved by using multiple edge reflections with simultaneous extension of the flight path and flight time in the first MR-TOF. The associated shrinking of mass range is no longer important, since the gate admits one m/z of parent ions anyway. In this case it is also desirable to reduce the energy spread of parent ions below 50 eV at the cost of a larger turn-around time, which may be compensated by a longer flight path, lower acceleration energy and longer flight time in the first analyzer.

Mass selected parent ions are decelerated to about 50-100 eV and are focused at the entrance aperture of the fragmentation cell 152. Injection at such energies causes fragmentation of selected parent ions. Fragments are stored in the fragmentation cell 152 by RF confinement in RF trap 157 and by arranging axial DC well, formed by DC potentials of auxiliary electrodes and of the exit aperture. By applying electric pulses to those electrodes, the fragment ions are pulse ejected into the second MR-TOF for mass analysis. Parameters of ion pulse and of the second analyzer are similar to those in the first MR-TOF. The CID cell may incorporate various elements and schemes of pulsed ion sources described earlier. Thus, mass analysis of fragments is expected at a high resolving power (resolution) about 50,000 to 100,000. The described tandem allows a complete usage of analysis time. While fragment cell 152 is emptied and fragment ions are mass separated in the second MR-TOF 31B the first analyzer 31A may be used for simultaneous selection of parent ions and injection into the fragmentation cell.

FIG. 17 shows an economy tandem instrument 181 comprising a pulsed ion source 51, a single MR-TOF analyzer 31 and an optional fragmentation cell 182. Either gas filled storage device of the tandem 181, including storage device 73 or 83 of the pulsed ion source 51 or the optional fragmentation cell 182 can be used to fragment ions and to inject them back into the same MR-TOF for subsequent mass analysis or separation. As a result, the instrument allows a high resolution sequential MS-MS analysis or a multi-step $MS^n$ sequential analysis, simply by repeating steps of ions selection, fragmentation and reverse injection.

Multiple usage of MR-TOF also requires minor adjustment of deflection regimes in the MR-TOF. Let us consider an example of tandem 181 which employs the cell 182 for ion fragmentation. At a stage of parent separation, both deflectors 32 and 33 stay on at constant steering potentials. Ions follow the sequence of trajectories 35, 36, 37 and 39. Timed ion gate 172 admits ions of interest into the cell along the trajectory 39. Ions are decelerated to about 50-100 eV and undergo fragmentation. Fragments are stored by RF fields on electrodes 187 and DC trapping potential formed by entrance aperture 184, auxiliary electrodes 188 and the back electrode 189. After sufficient predetermined delay ions are collisional dampened and are pulse ejected out of the cell towards the MR-TOF. They follow the revert trajectory 39, then 37. However, at about the time of ion ejection from the cell the deflector 33 is switched into a different deflecting mode. Ions are steered at half angle, bounce from the right mirror along the trajectory 190 and revert their motion along trajectory 37 and then 39. Then either deflector 32 is turned off to pass all the ions onto the off-line detector 34 or timed ion selector 172 is used to select daughter ions of interest to pass them into fragmentation cell for further steps of $MS^n$ analysis. Similarly, if storage ion guide 73 or 83 is used for ion fragmentation, the returning of ions into the storage device could be arranged by deflector 33, deflecting ions at half angle. After straight reflection in the mirror ions would return along the same trajectory 36. This allows passing ions between fragmentation cell and MR-TOF analyzer for a desired number of cycles. Again, multiple edge deflections could be used to enhance selection of single specimen. A dual storage arrangement also allows saving on ion duty cycle by storing continuously coming ions in the first compartment, while using the second compartment for a pulse ejection of prestored ions and then for ion fragmentation in a multi-stage MS-MS analysis.

The described preferred embodiment is meant to be an explanatory example, not intended to be limiting. Further, it may be apparent to those skillful of the art that numerous changes could be made while staying within the spirit and principle of the invention.

The invention claimed is:

1. A multi-reflecting time-of-flight mass spectrometer (MR-TOF MS) comprising:
- an ion source;
- an ion receiver downstream from said ion source;
- at least one ion mirror assembly intermediate said ion source and said ion receiver and elongated in a shift direction for improving sensitivity and resolution of the MR-TOF MS;
- a drift space intermediate said ion mirror assembly; and
- a lens assembly disposed within said drift space along said at least one shift direction and with a period in said shift direction corresponding to ion shift per integer number of ion reflections,
- said ion source, ion receiver, ion mirror assembly and said drift space arranged to provide a folded ion path between said ion source and said ion receiver composed of at least one reflection by said ion mirror assembly for separating ions in time according to their mass-to-charge ratio (m/z) so that a flight time of the ions is substantially independent of ion energy.

2. The MR-TOF MS as defined in claim 1, further comprising: a timed ion selector including one of a Bradbury-Nielsen ion gate, a parallel plate deflector, and a control grid within said ion receiver.

3. The MR-TOF MS as defined in claim 1, wherein said ion source comprises one of an ion storage device and an ion accelerator.

4. The MR-TOF MS as defined in claim 1, wherein said ion source comprises a continuous ion source.

5. The MR-TOF MS as defined in claim 1, wherein said ion source comprises one of a SIMS, a MALDI, and an IR-MALDI.

6. The MR-TOF MS as defined in claim 4, wherein said ion source comprises one of an ESI, an APCI, an APPI, an EI, a CI, a PI, an ICP, a gas-filled MALDI, an atmospheric MALDI, a gaseous ion reaction cell, a DC/field asymmetric ion mobility spectrometer, and a fragmentation cell.

7. The MR-TOF MS as defined in claim 1, wherein said ion receiver includes an ion detector having an extended dynamic range.

8. The MR-TOF MS as defined in claim 1, wherein said ion receiver comprises a gas-filled cell selected from one of a fragmentation cell, a molecular reaction cell, an ion reaction cell, electron capture dissociation, ion capture dissociation, a soft deposition cell, and a cell for surface ion dissociation.

9. A multi-reflecting time-of-flight mass spectrometer (MR-TOF MS) comprising:

an ion source;

an ion receiver downstream from said ion source;

at least one ion mirror assembly intermediate said ion source and said ion receiver and elongated in a shift direction for improving sensitivity and resolution of the MR-TOF MS; and a drift space intermediate said ion mirror assembly, said ion source, ion receiver, ion mirror assembly and said drift space arranged to provide a folded ion path between said ion source and said ion receiver composed of at least one reflection by said ion mirror assembly for separating ions in time according to their mass-to-charge ratio (m/z) so that a flight time of the ions is substantially independent of ion energy, wherein said ion mirror assembly comprises a plurality of electrodes shaped and spaced relative to one another to provide a spatial ion focusing and time-of-flight focusing of ions substantially independent of ion energy and on ion position in a plane transverse to said ion path.

10. The MR-TOF MS as defined in claim 1, wherein said ion mirror assembly includes one of a parallel assembly of conductive square frames, slotted plates, bars, and rods, each having an optional edge termination.

11. The MR-TOF MS as defined in claim 1, wherein at least a portion of said ion mirror assembly is operably connected to a pulsed voltage supply for gating ions in or out of the MR-TOF MS.

12. The MR-TOF MS as defined in claim 1, wherein said ion mirror assembly comprises at least two electrodes having voltages of opposite polarities relative to the other to form an attractive lens.

13. The MR-TOF MS as defined inclaim 1, wherein said drift space comprises an ion deflector connected to one of a DC voltage supply and a pulsed voltage supply.

14. The MR-TOF MS as defined in claim 1, wherein said lens assembly includes at least two lenses elongated transversely to said ion path.

15. The MR-TOF MS as defined in claim 3, wherein said ion storage device comprises a gas-filled set of electrodes having a radio-frequency (RF) voltage applied to at least one of said electrodes.

16. The MR-TOF MS as defined in claim 3, wherein said ion storage device comprises a plurality of sets of electrodes having a radio frequency (RF) voltage applied to at least one electrode in a first set of electrodes and a pulse voltage applied to at least one electrode in a second set of electrodes.

17. The MR-TOF MS as defined in claim 3, wherein said ion accelerator comprises a pulsed orthogonal accelerator.

18. The MR-TOF MS as defined in claim 3, wherein said ion accelerator comprises a plurality of electrodes, each having a slit along said shift direction of the MR-TOF MS.

19. The MR-TOF MS as defined in claim 3, wherein said ion accelerator comprises one of a pulsed ion mirror assembly and a pulsed portion of said ion mirror assembly.

20. The MR-TOF MS as defined in claim 3, wherein said ion accelerator comprises one of an accelerator with pulsed voltages and an accelerator with static voltages.

21. The MR-TOF MS as defined in claim 4, wherein said continuous ion source comprises an intermediate ion storage guide preceding said ion storage device and having a gas pressure greater than said ion storage device.

22. The MR-TOF MS as defined in claim 4, wherein said continuous ion source comprises at least two gas-filled sets of electrodes having a radio-frequency (RF) voltage applied to at least one set of said gas-filled electrodes.

23. The MR-TOF MS as defined in claim 7, wherein said ion detector comprises one of a secondary electron multiplier having at least one dynode, a scintillator and photomultiplier, a micro-channel, micro-sphere plates, at least two channels of detection, and at least two anodes each connected to a data acquisition system having an analog-to-digital converter (ADC).

24. The MR-TOF MS as defined in claim 7, wherein said ion detector dynamic range is extended by alternating scans with various intensities of said pulsed ion source.

25. The MR-TOF MS as defined in claim 7, wherein said ion detector dynamic range is extended by alternating scans with varying durations of ion injection into an ion storage device.

26. The MR-TOF MS as defined in claim 8, wherein said gas-filled cell includes at least one electrode connected to a radio-frequency (RF) voltage for one of dampening ion kinetic energy in gas collisions, stabilizing internal ion energy, confining ions, fragmenting ions, selecting ion species and retaining ions for exposure to reactant particles.

27. The MR-TOF MS as defined in claim 13, wherein said ion deflector comprises at least one steering plate.

28. The MR-TOF MS as defined in claim 13, wherein said ion deflector is located on a far side of said shift axis opposite to said ion source for steering ions in a static mode to change direction of said ion path.

29. The MR-TOF MS as defined in claim 13, wherein said ion deflector is located on a similar side of said shift axis as said ion source for directing ions toward one of an off-axis detector and an MR-TOF MS analyzer, and revert in a direction of ion shift for a time of ion confinement within the MR-TOF MS.

30. The MR-TOF MS as defined in claim 15, wherein said gas-filled set of electrodes comprises at least one of an ion guide having a plurality of elongated rods, a 3-D quadrapole ion trap, a linear ion trap with ion ejection, an RF channel with at least one electrode having an opening for ion passage, a ring electrode trap, a hybrid ion guide with a 3-D ion trap, and a segmented analog of the aforementioned electrodes formed of at least two plates.

31. The MR-TOF MS as defined in claim 4, wherein said ion storage device includes one of a filter of ion components, a discriminator of ion components, and a suppressor of ion components.

32. A tandem time-of-flight mass spectrometer apparatus, comprising:

a pulsed ion source;

said MR-TOF MS of claim 1 provided to separate parent ions;

a fragmentation cell downstream of said MR-TOF MS for fragmenting the parent ions into daughter ions; and a mass spectrometer downstream of said fragmentation cell for detecting said daughter ions;

wherein said at least one ion mirror assembly comprises two grid-less and parallel ion mirrors separated by a drift space and substantially elongated in one shift-direction.

33. The mass spectrometer apparatus as defined in claim 32, further comprising an ion selector subsequent said fragmentation cell.

34. The mass spectrometer apparatus as defined in claim 32, wherein said fragmentation cell comprises a gas-filled cell having a differential pumping stage and an ion focusing device.

35. The mass spectrometer apparatus as defined in claim 32, wherein said fragmentation cell comprises an internal gas pressure P associated with a cell length L (P*L) above 0.2 Torr*cm.

36. The mass spectrometer apparatus as defined in claim 32, wherein said fragmentation cell comprises a gas pressure P>0.5 Torr and L<1 cm.

37. The mass spectrometer apparatus as defined in claim 32, wherein said fragmentation cell comprises a gas filled set of electrodes having a radio frequency (RF) voltage applied to at least one of said electrodes for confining ions in radial direction.

38. The mass spectrometer apparatus as defined in claim 32, wherein said fragmentation cell further comprises a set of electrodes connected to one of a DC and slow-varying voltage to form an axial DC electric field, and an axial moving-wave electric field to control velocity of ion motion in said fragmentation cell, said DC voltage being applied to one of the same set of electrodes and a dissimilar set of electrodes.

39. The mass spectrometer apparatus as defined in claim 32, wherein said mass spectrometer downstream of said fragmentation cell comprises a time-of-flight mass spectrometer (TOF MS).

40. The mass spectrometer apparatus as defined in claim 39, wherein said TOF MS comprises an orthogonal ion accelerator.

41. The mass spectrometer apparatus as defined in claim 39, wherein said TOF MS comprises ion path less than, and an acceleration voltage greater than in said MR-TOF MS to produce an ion flight time in said TOF MS at least 100-fold less than in said MR-TOF MS.

42. The mass spectrometer apparatus as defined in claim 39, wherein said TOF MS comprises a data system adapted for parallel acquisition of daughter spectra without mixing spectra corresponding to different parent ions.

43. The mass spectrometer apparatus as defined in claim 39, wherein said TOF MS includes a first and a second multi-reflecting time-of-flight mass spectrometer (MR-TOF MS).

44. The mass spectrometer apparatus as defined in claim 43, wherein said second MR-TOF MS is substantially identical in construction to said first MR-TOF MS.

45. The mass spectrometer apparatus as defined in claim 40, wherein said orthogonal ion accelerator is grid-less.

46. The mass spectrometer apparatus as defined in claim 44, wherein the second MR-TOF MS forming said TOF MS comprises a plurality of deflectors cooperating with lenses in said drift space to adjust a flight path of the ions in said TOF MS.

47. A tandem multi-reflecting time-of-flight mass spectrometer (MR-TOF MS-MS) apparatus comprising:

a first multi-reflecting time-of-flight mass spectrometer (MR-TOF MS) for separating parent ions;

a fragmentation cell attached to said first MR-TOF MS for receiving said parent ions; and a second MR-TOF MS attached to said fragmentation cell for mass analysis of daughter ions exiting said fragmentation cell, wherein at least one of said MR-TOF MS comprises at least two grid-less and parallel ion mirrors separated by drift space and substantially elongated in one shift-direction, wherein at least one of said first and second MR-TOF MS comprises:

an ion source;

an ion receiver downstream from said ion source;

at least one ion mirror assembly intermediate said ion source and said ion receiver and elongated in a shift direction for improving sensitivity and resolution of the MR-TOF MS;

a drift space intermediate said ion mirror assembly; and a lens assembly disposed within said drift space along said at least one shift direction and with a period in said shift direction corresponding to ion shift per integer number of ion reflections, said ion source, ion receiver, ion mirror assembly and said drift space arranged to provide a folded ion path between said ion source and said ion receiver composed of at least one reflection by said ion mirror assembly for separating ions in time according to their mass-to-charge ratio (m/z) so that a flight time of the ions is substantially independent of ion energy.

48. The tandem MR-TOF MS-MS apparatus as defined in claim 47, further comprising a timed ion selector between said first MR-TOF MS and said fragmentation cell.

49. The tandem MR-TOF MS-MS apparatus as defined in claim 47, wherein said fragmentation cell further comprises at least one set of electrodes connected to one of DC and slow varying voltage to form one of a respective axial DC electric field or an axial moving-wave electric field, controlling velocity of ion motion within said fragmentation cell, and said DC voltage being applied to at least one electrode in said at least one set as RF voltage.

50. The tandem MR-TOF MS-MS apparatus as defined in claim 47, wherein said fragmentation cell further includes a gas at a gas pressure (P) above P*L>0.2 Torr*cm.

51. The tandem MR-TOF MS-MS apparatus as defined in claim 47, wherein said fragmentation cell comprises a differential pumping stage and an ion focusing assembly.

52. The tandem MR-TOF MS-MS apparatus as defined in claim 47, wherein said fragmentation cell comprises at least one gas-filled set of electrodes having a radio frequency (RF) voltage applied to at least one electrode within said set of electrodes to confine ions in a radial direction.

53. The tandem MR-TOF MS-MS apparatus as defined in claim 47, wherein said fragmentation cell comprises means for ion storage and pulsed ejection in one of an axial and an orthogonal direction.

54. The tandem MR-TOF MS-MS apparatus as defined in claim 50, wherein said second TOF MS comprises an orthogonal ion accelerator.

55. The tandem MR-TOF MS-MS apparatus as defined in claim 53, wherein said second MR-TOF MS comprises means for adjusting an ion path less than, and an acceleration voltage greater than, said first MR-TOF MS such that a flight time in said TOF MS is at least 100-fold less compared to said flight time in said first MR-TOF MS.

56. The tandem MR-TOF MS-MS apparatus as defined in claim 52, wherein said second MR-TOF MS comprises a data system providing parallel acquisition of daughter spectra without mixing spectra from unrelated parent ions.

57. The tandem MR-TOF MS-MS apparatus as defined in claim 56, wherein said second MR-TOF MS comprises a lens assembly disposed within said drift space.

58. The tandem MR-TOF MS-MS apparatus as defined in claim 57, wherein said lens assembly comprises at least one deflector configured to adjust a flight path of ions in said second MR-TOF MS.

59. A multi-reflecting time-of-flight mass spectrometer (MR-TOF MS-MS) apparatus comprising:

a multi-reflecting time-of-flight mass spectrometer (MR-TOF MS); and a fragmentation cell connected to said MR-TOF MS and configured to revert ions within said MR-TOF MS to employ the same MR-TOF analyzer for analysis of both parent ions and fragment ions, wherein said MR-TOF MS comprises an assembly of two grid-less and parallel ion mirrors separated by drift space and substantially elongated in one shift-direction, wherein said MR-TOF MS comprises:

an ion source;

an ion receiver downstream from said ion source;

at least one ion mirror assembly intermediate said ion source and said ion receiver and elongated in a shift direction for improving sensitivity and resolution of the MR-TOF MS;

a drift space intermediate said ion mirror assembly; and a lens assembly disposed within said drift space along said at least one shift direction and with a period in said shift direction corresponding to ion shift per integer number of ion reflections, said ion source, ion receiver, ion mirror assembly and said drift space arranged to provide a folded ion-path between said ion source and said ion receiver composed of at least one reflection by said ion mirror assembly for separating ions in time according to their mass-to-charge ratio (m/z) so that a flight time of the ions is substantially independent of ion energy.

* * * * *